(12) United States Patent
Huang

(10) Patent No.: US 12,222,433 B2
(45) Date of Patent: Feb. 11, 2025

(54) RELATIVE ANGLE-BASED POSITIONING METHOD AND APPARATUS

(71) Applicant: Huawei Technologies Co., Ltd., Shenzhen (CN)

(72) Inventor: Su Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 431 days.

(21) Appl. No.: 17/673,582

(22) Filed: Feb. 16, 2022

(65) Prior Publication Data

US 2022/0171014 A1    Jun. 2, 2022

Related U.S. Application Data

(63) Continuation of application No. PCT/CN2020/100311, filed on Jul. 5, 2020.

(30) Foreign Application Priority Data

Aug. 16, 2019    (CN) .......................... 201910760340.7

(51) Int. Cl.
*G01S 5/00* (2006.01)
*G01S 5/02* (2010.01)
(Continued)

(52) U.S. Cl.
CPC .......... *G01S 5/0284* (2013.01); *G01S 5/0036* (2013.01); *H04L 5/0048* (2013.01); *H04W 64/006* (2013.01)

(58) Field of Classification Search
CPC ... G01S 5/0284; G01S 5/0036; H04L 5/0048; H04W 64/006
(Continued)

(56) References Cited

U.S. PATENT DOCUMENTS

2011/0124347 A1    5/2011    Chen et al.
2019/0200181 A1    6/2019    Abou-Rizk et al.
(Continued)

FOREIGN PATENT DOCUMENTS

CN    104540099 A    4/2015
CN    105264920 A    1/2016
(Continued)

OTHER PUBLICATIONS

"DL and UL NR Positioning Procedures," 3GPP TSG-RAN WG2 Meeting #106, Reno, Nevada, USA, R2-1906779 Revision of R2-1903135, pp. 1-8, 3rd Generation Partnership Project, Valbonne, France (May 13-17, 2019).
(Continued)

*Primary Examiner* — Ted M Wang
(74) *Attorney, Agent, or Firm* — Leydig, Voit & Mayer, Ltd.

(57) ABSTRACT

This application provides a relative angle-based positioning method and an apparatus. In the method, a network device can flexibly select a reference direction, and support linear array-based angle positioning. The method includes: A network device participating in positioning exchanges an uplink positioning configuration with a positioning center, a terminal device, and a serving cell that participate in positioning. The network device participating in positioning receives a first reference signal sent by the terminal device. The network device participating in positioning determines angle measurement information based on the first reference signal. The network device participating in positioning reports the angle measurement information to the positioning center, where the angle measurement information includes a set reference direction and an angle of a direction of the terminal device relative to the set reference direction. The positioning center determines a location of the terminal (Continued)

device based on the received angle measurement information.

17 Claims, 8 Drawing Sheets

(51) Int. Cl.
  *H04L 5/00* (2006.01)
  *H04W 64/00* (2009.01)
(58) Field of Classification Search
  USPC ...................................................... 455/456.1
  See application file for complete search history.

(56) References Cited

U.S. PATENT DOCUMENTS

| | | | | |
|---|---|---|---|---|
| 2020/0103513 | A1* | 4/2020 | Knaappila | H04B 17/27 |
| 2021/0092702 | A1* | 3/2021 | Kenington | H04B 7/06 |

FOREIGN PATENT DOCUMENTS

| | | |
|---|---|---|
| CN | 105589506 A | 5/2016 |
| CN | 106569173 A | 4/2017 |
| CN | 106872939 A | 6/2017 |
| CN | 108293172 A | 7/2018 |
| CN | 108398675 A | 8/2018 |
| CN | 109195097 A | 1/2019 |
| CN | 109342993 A | 2/2019 |
| CN | 110333478 A | 10/2019 |
| EP | 3306337 A1 | 4/2018 |

OTHER PUBLICATIONS

"3rd Generation Partnership Project; Technical Specification Group Radio Access Network; Evolved Universal Terrestrial Radio Access (E-UTRA); Physical layer; Measurements (Release 15)," 3GPP TS 36.214 V15.3.0, pp. 1-25, 3rd Generation Partnership Project, Valbonne, France (Sep. 2018).

"UL Reference Signals for NR Positioning," 3GPP Tsg Ran WG1 Meeting #97, Reno, USA, R1-1906306, pp. 1-7, 3rd Generation Partnership Project, Valbonne, France (May 13-17, 2019).

"UL Reference Signals for NR Positioning," 3GPP TSG RAN WG1 #97, Reno, USA, R1-1906908, pp. 1-6, 3rd Generation Partnership Project, Valbonne, France (May 13-17, 2019).

* cited by examiner

RELATIVE ANGLE-BASED POSITIONING METHOD AND APPARATUS

CROSS-REFERENCE TO RELATED APPLICATIONS

This application is a continuation of International Application No. PCT/CN2020/100311, filed on Jul. 5, 2020, which claims priority to Chinese Patent Application No. 201910760340.7, filed on Aug. 16, 2019. The disclosures of the aforementioned applications are hereby incorporated by reference in their entireties.

TECHNICAL FIELD

Embodiments of this application relate to the wireless communications field, and more specifically, to a relative angle-based positioning method and an apparatus.

BACKGROUND

In a future fifth-generation (5th generation, 5G) system or a new radio (NR) system, an angle-based positioning technology is introduced. A specific method is that a terminal device sends a sounding reference signal (SRS) to a base station, and a serving cell base station and a neighboring cell base station receive and measure the sounding reference signal SRS. When receive antennas of the serving cell base station and the neighboring cell base station have an array form, the serving cell base station and the neighboring cell base station may estimate a beam direction of the received sounding reference signal based on a phase shift caused by a wave path difference between a plurality of antenna array elements, to determine a direction of the terminal device and finally determine a location of the terminal device.

In most of angle-based positioning solutions in the conventional technology, a location of a terminal device is determined based on absolute angle information. The absolute angle information is an included angle between a direction of the terminal device and an absolute direction. For example, a direction angle of the terminal device is defined as an included angle between a projection of the direction of the terminal device in a horizontal plane and a geographical north direction, and is a positive angle after counterclockwise rotation is performed. For example, a pitch angle of the terminal device is defined as an included angle between the direction of the terminal device and a zenith direction. In the solutions in the conventional technology, the location of the terminal device is generally determined by estimating the direction angle and the pitch angle of the terminal device. In the method, a plurality of rays are determined by a plurality of base stations, and an intersection point of the ray's is the location of the terminal device. When the direction angle and the pitch angle of the terminal device are estimated by using the method, an antenna array of the base station needs to be a planar array, that is, a two-dimensional antenna array. Consequently, construction costs of the base station increase, and a form of the antenna array is limited. In the conventional technology, the location of the terminal device may alternatively be determined by using only the direction angle. In the method, a plurality of planes are determined by a plurality of base stations, and the location of the terminal is an intersection line or an intersection point of the plurality of planes. Generally, an intersection line of a horizontal plane is perpendicular to the horizontal plane. This means that horizontal coordinates of the terminal device can be obtained. However, when the antenna array of the base station is a linear array, the method is only applicable to horizontal antenna linear array positioning, and is an approximate method when the pitch angle is close to 90 degrees (for example, the terminal device is relatively far from the base station, and an elevation difference may be ignored). When the terminal device is relatively close to the base station, an approximate error of the method is relatively large. Consequently, estimation of the direction angle of the terminal device is inaccurate, and a positioning error of the terminal device increases.

SUMMARY

This application provides a relative angle-based positioning method and an apparatus, so that a network device can flexibly select a reference direction, and support linear array antenna-based angle positioning. Therefore, a problem that positioning is inaccurate when a terminal device approaches the network device does not exist, and positioning accuracy of the terminal device is improved.

According to a first aspect, a relative angle-based positioning method is provided. The method may be applied to an uplink positioning process, and is performed by a network device or a positioning center, or performed by a chip or a circuit disposed in the network device or the positioning center. This is not limited in this application. For ease of description, the following uses an example in which the network device performs the relative angle-based positioning method provided in the first aspect for description.

The relative angle-based positioning method includes:

A network device participating in positioning exchanges an uplink positioning configuration with a positioning center, a terminal device, and a serving cell that participate in positioning. The network device participating in positioning receives a first reference signal sent by the terminal device. The network device participating in positioning determines angle measurement information based on the first reference signal, where the angle measurement information includes a set reference direction and an angle of a direction of the terminal device relative to the set reference direction. The network device participating in positioning reports the angle measurement information to the positioning center.

It should be understood that there are one or more network devices participating in positioning, and the angle measurement information is in a one-to-one correspondence with the network device participating in positioning.

According to the relative angle-based positioning method provided in this application, in a process in which the network device performs uplink angle positioning of a linear array antenna based on an intersection line of conical surfaces instead of an intersection line of planes in the conventional technology, and a problem in the conventional technology that a positioning error is relatively large when the terminal device approaches the network device does not exist, thereby improving uplink positioning accuracy.

With reference to the first aspect, in a possible implementation of the first aspect, the foregoing relative angle-based positioning method further includes: The positioning center determines a location of the terminal device based on the angle measurement information.

The positioning center in this embodiment of this application includes a location management component (LMC), a location management function (LMF), or another device that can implement a function of the LMC or the LMF in this embodiment of this application. The location management component LMC undertakes some functions of the LMF and can be integrated into a network device on an NG-RAN side. In this way, to implement the functions of the LMF that the LMC undertakes, a 5G core network does not need to be introduced by using an AMF, thereby reducing a signaling latency.

With reference to the first aspect, in a possible implementation of the first aspect, that the positioning center determines a location of the terminal device based on the angle measurement information includes: The positioning center determines a plurality of conical surfaces based on the angle measurement information, where the plurality of conical surfaces are in a one-to-one correspondence with the angle measurement information, and the angle measurement information is in a one-to-one correspondence with the network device participating in positioning, where each of the plurality of conical surfaces is centered on a set reference direction included in the angle measurement information corresponding to each of the plurality of conical surfaces. The positioning center determines the location of the terminal device based on an intersection point or an intersection line of the plurality of conical surfaces.

It should be understood that, in the conventional technology, a terminal device is positioned based on an intersection line of planes in an angle positioning process of an antenna linear array, and positioning of the terminal device is inaccurate due to an inaccurate estimated direction angle when the terminal device approaches a network device. In this application, in an angle positioning process of an antenna linear array, the terminal device is positioned based on an intersection line of conical surfaces instead of an intersection line of planes in the conventional technology, and a problem in the conventional technology that a positioning error is relatively large when the terminal device approaches the network device does not exist, thereby helping improve downlink location accuracy.

With reference to the first aspect, in a possible implementation of the first aspect, the set reference direction includes a direction angle, or a direction angle and a pitch angle; and when the set reference direction includes only the direction angle, a corresponding pitch angle is set to $\pi/2$.

The foregoing technical solution still uses a parameter included in the reference direction in the conventional technology, but definitions of the direction angle and the pitch angle are different from those in the conventional technology. In most of angle-based positioning solutions in the conventional technology, a location of a terminal device is determined based on absolute angle information. The absolute angle information is an included angle between a direction of the terminal device and an absolute reference direction. For example, a direction angle of the terminal device is defined as an included angle between a projection of the direction of the terminal device in a horizontal plane and a geographical north direction, and is a positive angle after counterclockwise rotation is performed. For example, a pitch angle of the terminal device is defined as an included angle between the direction of the terminal device and a zenith direction. Although the reference direction in this application still uses a parameter included in the reference direction in the conventional technology, but a specific direction may be randomly selected by the network device participating in positioning, and flexible reference direction setting is supported.

With reference to the first aspect, in a possible implementation of the first aspect, the angle of the direction of the terminal device relative to the set reference direction is in a range of $[0, \pi]$, where when the angle is 0), it indicates that the direction of the terminal device is the same as the set reference direction, when the angle is $\pi/2$, it indicates that the direction of the terminal device is perpendicular to the set reference direction, and when the angle is $\pi$, it indicates that the direction of the terminal device is opposite to the set reference direction.

The foregoing technical solution is used to define three special cases in which the location of the terminal device is determined based on a value of the angle of the direction of the terminal device relative to the set reference direction, and the method provided in this application may be better performed by understanding the foregoing three special cases.

With reference to the first aspect, in a possible implementation of the first aspect, a setting manner of the reference direction includes at least one of the following: an orientation of an antenna linear array of the network device participating in positioning; an orientation of a horizontal dimension of an antenna planar array of the network device participating in positioning; or a direction randomly selected by the network device participating in positioning.

In most of angle-based positioning solutions in the conventional technology, a location of a terminal device is determined based on absolute angle information. The absolute angle information is an included angle between a direction of the terminal device and an absolute reference direction. For example, a direction angle of the terminal device is defined as an included angle between a projection of the direction of the terminal device in a horizontal plane and a geographical north direction, and is a positive angle after counterclockwise rotation is performed. For example, a pitch angle of the terminal device is defined as an included angle between the direction of the terminal device and a zenith direction. In this application, the reference direction may be randomly selected by the network device participating in positioning, and flexible reference direction setting is supported.

With reference to the first aspect, in a possible implementation of the first aspect, the positioning center is a location management function or a location management component, and the location management component is integrated into a network device of the serving cell, or integrated into the network device participating in positioning, or integrated into a network device that does not participate in positioning.

It should be understood that the location management component LMC undertakes some functions of the LMF and can be integrated into a network device on an NG-RAN side. In this way, to implement the functions of the LMF that the LMC undertakes, a 5G core network does not need to be introduced by using an AMF, thereby reducing a signaling latency.

With reference to the first aspect, in a possible implementation of the first aspect, the network device participating in positioning includes a network device of the serving cell, or does not include a network device of the serving cell.

According to the foregoing technical solution, the network device participating in positioning may be flexibly selected, and may be a network device of the serving cell or a network device of a non-serving cell. Selection of the network device is not limited.

With reference to the first aspect, in a possible implementation of the first aspect, the uplink positioning configuration includes uplink sounding reference signal configuration information or uplink physical random access channel configuration information.

It should be understood that the uplink sounding reference signal configuration information and the uplink physical random access channel configuration information are only two examples of the uplink positioning configuration information. This is not limited in this application. The two examples are two pieces of common uplink positioning configuration information that may be applied to the relative angle-based positioning method provided in this application.

According to a second aspect, a relative angle-based positioning method is provided. The method may be applied to a downlink positioning process, and is performed by a positioning center or a network device, or performed by a chip or a circuit disposed in the positioning center or the network device. This is not limited in this application. For ease of description, the following uses an example in which the positioning center performs the relative angle-based positioning method provided in the second aspect for description. The positioning center in this embodiment of this application includes a location management component (LMC), a location management function (LMF), or another device that can implement a function of the LMC or the LMF in this embodiment of this application.

The relative angle-based positioning method includes:

A positioning center participating in positioning exchanges a downlink positioning configuration with a network device, a terminal device, and a serving cell that participate in positioning. The positioning center receives power measurement information reported by the terminal device, where the power measurement information includes one or more pieces of reference signal received power and/or one or more pieces of path power that are of one or more second reference signals and that are determined by the terminal device. The positioning center sends request location information to the network device participating in positioning, where the request location information includes the power measurement information, the request location information is used to indicate the network device participating in positioning to determine angle measurement information based on the power measurement information, and the angle measurement information includes a set reference direction and an angle of a direction of the terminal device relative to the set reference direction. The positioning center receives the angle measurement information reported by the network device participating in positioning. The positioning center determines a location of the terminal device based on the angle measurement information.

It should be understood that there are one or more network devices participating in positioning, and the angle measurement information is in a one-to-one correspondence with the network device participating in positioning. The terminal device processes the one or more second reference signals to obtain one or more pieces of power measurement information. The network device participating in positioning processes the one or more pieces of power measurement information included in the request location information, to obtain the angle measurement information that is in a one-to-one correspondence with the network device participating in positioning. For example, the terminal device processes four second reference signals to obtain four pieces of power measurement information. Three network devices participating in positioning process the four pieces of power measurement information included in the request location information, to obtain three pieces of angle measurement information that are in a one-to-one correspondence with the three network devices participating in positioning.

According to the relative angle-based positioning method provided in this application, in a process in which the network device performs downlink angle positioning of a linear array antenna based on an intersection line of conical surfaces instead of an intersection line of planes in the conventional technology, and a problem in the conventional technology that a positioning error is relatively large when the terminal device approaches the network device does not exist, thereby improving downlink positioning accuracy.

With reference to the second aspect, in a possible implementation of the second aspect, after the positioning center receives the power measurement information reported by the terminal device, the relative angle-based positioning method further includes: The positioning center obtains the angle measurement information through calculation based on the power measurement information. The positioning center determines the location of the terminal device based on the angle measurement information.

In a possible implementation, the positioning center has a calculation capability, and may obtain the angle measurement information through calculation and/or measurement based on the power measurement information reported by the terminal device, and determine the location of the terminal device based on the angle measurement information. In this implementation, the steps of sending, by the positioning center, the request location information to the network device participating in positioning and receiving, by the positioning center, the angle measurement information reported by the network device participating in positioning may be omitted, and only another method step is performed. Therefore, the positioning method is simpler and has lower signaling overheads.

With reference to the second aspect, in a possible implementation of the second aspect, that the positioning center determines a location of the terminal device based on the angle measurement information includes: The positioning center determines a plurality of conical surfaces based on the angle measurement information, where the plurality of conical surfaces are in a one-to-one correspondence with the angle measurement information, and the angle measurement information is in a one-to-one correspondence with the network device participating in positioning, where each of the plurality of conical surfaces is centered on a set reference direction included in the angle measurement information corresponding to each of the plurality of conical surfaces. The positioning center determines the location of the terminal device based on an intersection point or an intersection line of the plurality of conical surfaces.

It should be understood that, in the conventional technology, a terminal device is positioned based on an intersection line of planes in an angle positioning process of an antenna linear array, and positioning of the terminal device is inaccurate due to an inaccurate estimated direction angle when the terminal device approaches a network device. In this application, in an angle positioning process of an antenna linear array, the terminal device is positioned based on an intersection line of conical surfaces instead of an intersection line of planes in the conventional technology, and a problem in the conventional technology that a positioning error is relatively large when the terminal device approaches the network device does not exist, thereby helping improve downlink location accuracy.

With reference to the second aspect, in a possible implementation of the second aspect, the set reference direction includes a direction angle, or a direction angle and a pitch angle; and when the set reference direction includes only the direction angle, a corresponding pitch angle is set to $\pi/2$.

The foregoing technical solution still uses a parameter included in the reference direction in the conventional technology, but definitions of the direction angle and the pitch angle are different from those in the conventional technology. In most of angle-based positioning solutions in the conventional technology, a location of a terminal device is determined based on absolute angle information. The absolute angle information is an included angle between a direction of the terminal device and an absolute reference direction. For example, a direction angle of the terminal device is defined as an included angle between a projection of the direction of the terminal device in a horizontal plane and a geographical north direction, and is a positive angle after counterclockwise rotation is performed. For example, a pitch angle of the terminal device is defined as an included angle between the direction of the terminal device and a zenith direction. Although the reference direction in this application still uses a parameter included in the reference direction in the conventional technology, but a specific direction may be randomly selected by the network device participating in positioning, and flexible reference direction setting is supported.

With reference to the second aspect, in a possible implementation of the second aspect, the angle of the direction of the terminal device relative to the set reference direction is in a range of [0, π], where when the angle is 0), it indicates that the direction of the terminal device is the same as the set reference direction, when the angle is π/2, it indicates that the direction of the terminal device is perpendicular to the set reference direction, and when the angle is π, it indicates that the direction of the terminal device is opposite to the set reference direction.

The foregoing technical solution is used to define three special cases in which the location of the terminal device is determined based on a value of the angle of the direction of the terminal device relative to the set reference direction, and the method provided in this application may be better performed by understanding the foregoing three special cases.

With reference to the second aspect, in a possible implementation of the second aspect, a setting manner of the reference direction includes at least one of the following: an orientation of an antenna linear array of the network device participating in positioning: an orientation of a horizontal dimension of an antenna planar array of the network device participating in positioning: or a direction randomly selected by the network device participating in positioning.

In most of angle-based positioning solutions in the conventional technology, a location of a terminal device is determined based on absolute angle information. The absolute angle information is an included angle between a direction of the terminal device and an absolute reference direction. For example, a direction angle of the terminal device is defined as an included angle between a projection of the direction of the terminal device in a horizontal plane and a geographical north direction, and is a positive angle after counterclockwise rotation is performed. For example, a pitch angle of the terminal device is defined as an included angle between the direction of the terminal device and a zenith direction. In this application, the reference direction may be randomly selected by the network device participating in positioning, and flexible reference direction setting is supported.

With reference to the second aspect, in a possible implementation of the second aspect, the positioning center is a location management function or a location management component, and the location management component is integrated into a network device of the serving cell, or integrated into the network device participating in positioning, or integrated into a network device that does not participate in positioning.

It should be understood that the location management component LMC undertakes some functions of the LMF and can be integrated into a network device on an NG-RAN side. In this way, to implement the functions of the LMF that the LMC undertakes, a 5G core network does not need to be introduced by using an AMF, thereby reducing a signaling latency.

With reference to the second aspect, in a possible implementation of the second aspect, the network device participating in positioning includes a network device of the serving cell, or does not include a network device of the serving cell.

According to the foregoing technical solution, the network device participating in positioning may be flexibly selected, and may be a network device of the serving cell or a network device of a non-serving cell. Selection of the network device is not limited.

With reference to the second aspect, in a possible implementation of the second aspect, the downlink positioning configuration includes synchronization signal block configuration information or positioning reference signal configuration information.

It should be understood that the synchronization signal block configuration information and the positioning reference signal configuration information are only two examples of the downlink positioning configuration information. This is not limited in this application. The two examples are two pieces of common downlink positioning configuration information that may be applied to the relative angle-based positioning method provided in this application.

According to a third aspect, a relative angle-based positioning method is provided. The method may be applied to an uplink positioning process, and is performed by a network device or a positioning center, or performed by a chip or a circuit disposed in the network device or the positioning center. This is not limited in this application. The first aspect is described by using an example in which the network device performs the relative angle-based positioning method provided in the first aspect. The following uses an example in which the positioning center performs the relative angle-based positioning method provided in the first aspect for description. The positioning center in this embodiment of this application includes a location management component (LMC), a location management function (LMF), or another device that can implement a function of the LMC or the LMF in this embodiment of this application.

The relative angle-based positioning method includes: A positioning center participating in positioning exchanges an uplink positioning configuration with a network device, a terminal device, and a serving cell that participate in positioning. The positioning center receives angle measurement information reported by the network device participating in positioning, where the angle measurement information is determined by the network device participating in positioning based on a first reference signal, the first reference signal is received by the network device participating in positioning from the terminal device, and the angle measurement information includes a set reference direction and an angle of a direction of the terminal device relative to the set reference direction. The positioning center determines a location of the terminal device based on the angle measurement information.

For various possible implementations of the third aspect, refer to the foregoing descriptions of the first aspect. Details are not described herein again.

According to a fourth aspect, a relative angle-based positioning method is provided. The method may be applied to a downlink positioning process, and is performed by a positioning center or a network device, or performed by a chip or a circuit disposed in the positioning center or the network device. This is not limited in this application. The second aspect is described by using an example in which the positioning center performs the relative angle-based positioning method provided in the second aspect. The following uses an example in which the network device performs the relative angle-based positioning method provided in the second aspect for description.

The relative angle-based positioning method includes: A network device participating in positioning exchanges a downlink positioning configuration with a positioning center, a terminal device, and a serving cell that participate in positioning. The network device participating in positioning sends a second reference signal to the terminal device.

The network device participating in positioning receives request location information sent by the positioning center, where the request location information includes power measurement information, the power measurement information is determined by the terminal device based on one or more second reference signals, the request location information is used to indicate the network device participating in positioning to determine angle measurement information based on the power measurement information, and the angle measurement information includes a set reference direction and an angle of a direction of the terminal device relative to the set reference direction. The network device participating in positioning reports the angle measurement information to the positioning center.

For various possible implementations of the fourth aspect, refer to the foregoing descriptions of the second aspect. Details are not described herein again.

According to a fifth aspect, a network apparatus is provided. The network apparatus includes a processor, configured to implement functions of the network device in the method described in the first aspect.

For example, the network apparatus further includes a memory, the memory is coupled to the processor, and the processor is configured to implement functions of the network device in the method described in the first aspect.

In a possible implementation, the memory is configured to store program instructions and data. The memory is coupled to the processor, and the processor may invoke and execute the program instructions stored in the memory, to implement functions of the network device in the method described in the first aspect.

For example, the network apparatus further includes a communications interface, and the communications interface is used by the network apparatus to communicate with another device. When the network apparatus is a network device, the communications interface includes a transceiver, or the communications interface includes an input/output interface.

In a possible design, the network apparatus includes a processor and a communications interface, configured to implement functions of the network device in the method described in the first aspect. Details are as follows:

The communications interface is used by the processor to perform external communication.

The processor is configured to run a computer program, so that the network apparatus implements the method described in the first aspect.

It may be understood that the external communication may be communication with an object other than the processor, or an object other than the apparatus.

In another implementation, when the network apparatus is a chip or a chip system, the communications interface includes an input/output interface, an interface circuit, an output circuit, an input circuit, a pin, a related circuit, or the like in the chip or the chip system. The processor is embodied as a processing circuit or a logic circuit.

According to a sixth aspect, a positioning management apparatus is provided. The positioning management apparatus includes a processor, configured to implement functions of the positioning center in the method described in the second aspect.

For example, the positioning management apparatus further includes a memory, the memory is coupled to the processor, and the processor is configured to implement functions of the positioning center in the method described in the second aspect.

In a possible implementation, the memory is configured to store program instructions and data. The memory is coupled to the processor, and the processor may invoke and execute the program instructions stored in the memory, to implement functions of the positioning center in the method described in the second aspect.

For example, the positioning management apparatus further includes a communications interface, and the communications interface is used by the positioning management apparatus to communicate with another device. When the positioning management apparatus is a positioning center, the communications interface is a transceiver, an input/output interface, a circuit, or the like.

In a possible design, the positioning management apparatus includes a processor and a communications interface, configured to implement functions of the positioning center in the method described in the first aspect. Details are as follows:

The communications interface is used by the processor to perform external communication.

The processor is configured to run a computer program, so that the positioning management apparatus implements the method described in the second aspect.

It may be understood that the external communication may be communication with an object other than the processor, or an object other than the positioning management apparatus.

In another possible design, the positioning management apparatus is a chip or a chip system. The communications interface may be an input/output interface, an interface circuit, an output circuit, an input circuit, a pin, a related circuit, or the like in the chip or the chip system. The processor may alternatively be embodied as a processing circuit or a logic circuit.

According to a seventh aspect, a positioning management apparatus is provided. The positioning management apparatus includes a processor, configured to implement functions of the positioning center in the method described in the third aspect.

For example, the positioning management apparatus further includes a memory, the memory is coupled to the processor, and the processor is configured to implement functions of the positioning center in the method described in the third aspect.

In a possible implementation, the memory is configured to store program instructions and data. The memory is coupled to the processor, and the processor may invoke and execute the program instructions stored in the memory, to implement functions of the positioning center in the method described in the third aspect.

For example, the positioning management apparatus further includes a communications interface, and the communications interface is used by the positioning management apparatus to communicate with another device. When the positioning management apparatus is a positioning center, the communications interface is a transceiver, an input/output interface, a circuit, or the like.

In a possible design, the positioning management apparatus includes a processor and a communications interface, configured to implement functions of the positioning center in the method described in the third aspect. Details are as follows:

The communications interface is used by the processor to perform external communication.

The processor is configured to run a computer program, so that the positioning management apparatus implements the method described in the third aspect.

It may be understood that the external communication may be communication with an object other than the processor, or an object other than the positioning management apparatus.

In another possible design, the positioning management apparatus is a chip or a chip system. The communications interface may be an input/output interface, an interface circuit, an output circuit, an input circuit, a pin, a related circuit, or the like in the chip or the chip system. The processor may alternatively be embodied as a processing circuit or a logic circuit.

According to an eighth aspect, a network apparatus is provided. The network apparatus includes a processor, configured to implement functions of the network device in the method described in the fourth aspect.

For example, the network apparatus further includes a memory; the memory is coupled to the processor, and the processor is configured to implement functions of the network device in the method described in the fourth aspect.

In a possible implementation, the memory is configured to store program instructions and data. The memory is coupled to the processor, and the processor may invoke and execute the program instructions stored in the memory, to implement functions of the network device in the method described in the fourth aspect.

For example, the network apparatus further includes a communications interface, and the communications interface is used by the network apparatus to communicate with another device. When the network apparatus is a network device, the communications interface includes a transceiver, or the communications interface includes an input/output interface.

In a possible design, the network apparatus includes a processor and a communications interface, configured to implement functions of the network device in the method described in the fourth aspect. Details are as follows:

The communications interface is used by the processor to perform external communication.

The processor is configured to run a computer program, so that the network apparatus implements the method described in the fourth aspect.

It may be understood that the external communication may be communication with an object other than the processor, or an object other than the network apparatus.

In another implementation, when the network apparatus is a chip or a chip system, the communications interface includes an input/output interface, an interface circuit, an output circuit, an input circuit, a pin, a related circuit, or the like in the chip or the chip system. The processor is embodied as a processing circuit or a logic circuit.

According to a ninth aspect, a computer-readable storage medium is provided. The computer-readable storage medium stores a computer program, and when the computer program is executed by a network apparatus, the network apparatus is enabled to implement the method in any one of the first aspect and the possible implementations of the first aspect or the method in any one of the fourth aspect and the possible implementations of the fourth aspect.

According to a tenth aspect, a computer-readable storage medium is provided. The computer-readable storage medium stores a computer program, and when the computer program is executed by a positioning management apparatus, the positioning management apparatus is enabled to implement the method in any one of the second aspect and the possible implementations of the second aspect or the method in any one of the third aspect and the possible implementations of the third aspect.

According to an eleventh aspect, a computer program product including instructions is provided. When the instructions are executed by a computer, the network apparatus is enabled to implement the method in any one of the first aspect and the possible implementations of the first aspect or the method in any one of the fourth aspect and the possible implementations of the fourth aspect.

According to a twelfth aspect, a computer program product including instructions is provided. When the instructions are executed by a computer, the positioning management apparatus is enabled to implement the method in any one of the second aspect and the possible implementations of the second aspect or the method in any one of the third aspect and the possible implementations of the third aspect.

According to a thirteenth aspect, a positioning system is provided, including the network apparatus described in the fifth aspect or the eighth aspect and the positioning management apparatus described in the sixth aspect or the seventh aspect.

The positioning system provided in the thirteenth aspect further includes a serving cell, a terminal device, and the like.

Based on the foregoing descriptions, according to the relative angle-based positioning method and the apparatus that are provided in this application, the network device can flexibly select the reference direction, and support linear array antenna-based angle positioning. Therefore, a problem that positioning is inaccurate when the terminal device approaches the network device does not exist, and positioning accuracy of the terminal device is improved. The solutions provided in this application may be applied to a scenario in which positioning is performed based on the set reference direction and the direction of the terminal device relative to the set reference direction, or may be applied to another scenario in which positioning needs to be performed on the terminal device.

DESCRIPTION OF EMBODIMENTS

Figure 1:
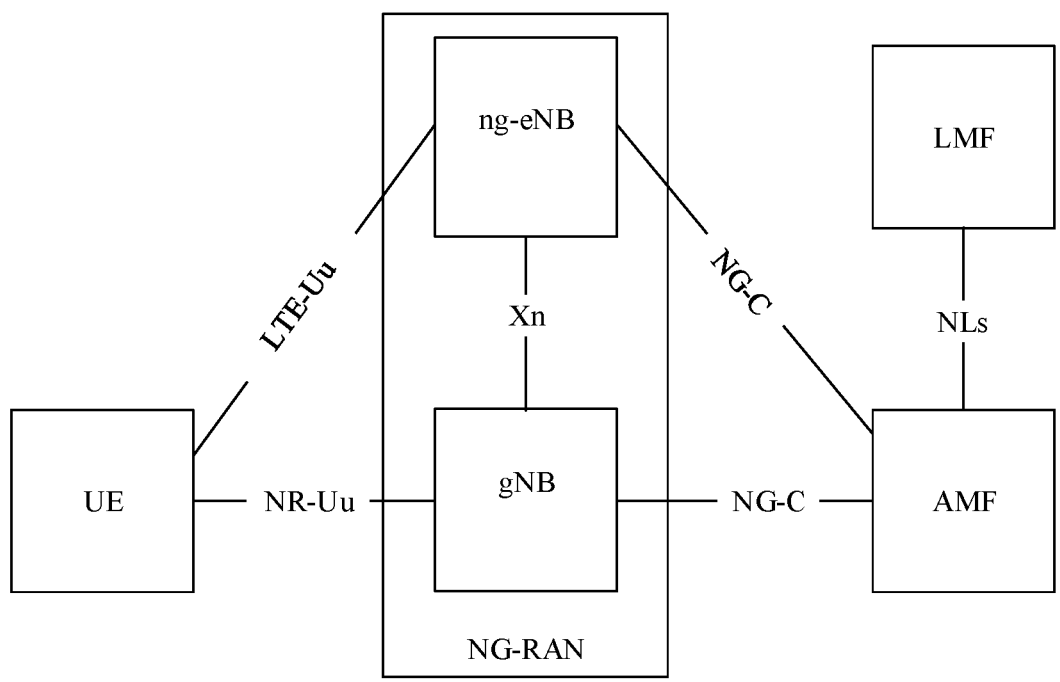
FIG. 1 is a schematic diagram of an architecture of a positioning system to which an embodiment of this application is applied.

The following clearly describes technical solutions of this application in detail with reference to the accompanying drawings.

The technical solutions in the embodiments of this application may be applied to various communications systems, for example, a long term evolution (long term evolution, LTE) system, an LTE frequency division duplex (FDD) system, an LTE time division duplex (TDD) system, a worldwide interoperability for microwave access (WiMAX) communications system, a future fifth-generation (5th generation, 5G) system or a future new radio (NR) system. The 5G mobile communications system in this application includes a non-standalone (NSA) 5G mobile communications system or a standalone (SA) 5G mobile communications system. The technical solutions provided in this application may be further applicable to a future communication system, for example, a sixth generation mobile communication system. The communications system to which this application is applied may alternatively be a public land mobile network (PLMN) network, a device-to-device (D2D) communications system, a machine-to-machine (M2M) communications system, an internet of things (IoT) communications system, or another communications system.

A terminal device (terminal equipment) in the embodiments of this application may be an access terminal, a subscriber unit, a subscriber station, a mobile station, a relay station, a remote station, a remote terminal, a mobile device, a user terminal, user equipment (UE), a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), a terminal device in a future internet of vehicles, or the like. This is not limited in the embodiments of this application.

As an example rather than a limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn by a user or integrated into clothes or an accessory of the user. The wearable device is not only a hardware device, but also implements a powerful function through software support, data exchange, and cloud interaction. The generalized wearable intelligent device has advantages such as full functions and a large size, and may not rely on a smartphone such as a smartwatch or smart glasses to implement all or some functions, but only focuses on a type of application function. The wearable intelligent device needs to cooperate with another device such as the smartphone to perform sign monitoring, for example, a smart band or smart jewelry.

In addition, the terminal device in the embodiments of this application may alternatively be a terminal device in an IoT system. IoT is an important part of future development of information technologies. A main technical feature of the IoT is connecting a thing to a network by using a communications technology, to implement an intelligent network for interconnection between a person and a machine or between one thing and another. In the embodiments of this application, the IoT technology may implement functions such as massive connection, deep coverage, and power saving of a terminal by using, for example, a narrow band (NB) technology.

In addition, in the embodiments of this application, the terminal device may alternatively include a sensor such as an intelligent printer, a train detector, or a gas station. Main functions of the terminal device include collecting data (for some terminal devices), receiving control information and downlink data from a network device, sending an electromagnetic wave, and transmitting uplink data to a network device.

A network device in the embodiments of this application may be any communications device that has a wireless transceiver function and that is configured to communicate with the terminal device. The device includes but is not limited to: an evolved NodeB (eNB), a base transceiver station (BTS), a home base station (home evolved NodeB, HeNB, or home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. The device may alternatively be a 5G NodeB (g NodeB, gNB) or a transmission point (TP) in a 5G system such as an NR system, one antenna panel or a group of antenna panels (including a plurality of antenna panels) of a 5G NodeB. The device may alternatively be a network node included in a 5G NodeB gNB or a transmission point TP, such as a baseband unit (BBU) or a distributed unit (DU).

In some deployments, the 5G NodeB (gNB) may include a centralized unit (CU) and a distributed unit (DU). The gNB may further include an active antenna unit (AAU). The CU implements some functions of the gNB, and the DU implements some functions of the gNB. For example, the CU is responsible for processing a non-real-time protocol and a service, to implement functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in a radio access network (radio access network. RAN), or may be a network device in a core network (CN). This is not limited in this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not particularly limited in the embodiments of this application, provided that a program that records related code for the method provided in the embodiments of this application can be run to perform communication according to the method provided in the embodiments of this application. For example, the execution body of the method provided in the embodiments of this application may be a network device or a function module that can invoke and execute the program in the network device.

FIG. 1 is a schematic diagram of an architecture of a positioning system to which an embodiment of this application is applied. As shown in FIG. 1, in the positioning system, a terminal device is separately connected to a radio access network through an LTE-Uu interface and/or an NR-Uu interface by using a next-generation eNodeB (next-generation eNodeB, ng-eNB) and a 5G NodeB (gNB). The radio access network is connected to a core network through an NG-C interface by using an access and mobility management function (access and mobility management function, AMF). A next-generation radio access network (next-generation radio access network, NG-RAN) may include one or more ng-eNBs. The NG-RAN may alternatively include one or more gNBs. The NG-RAN may alternatively include one or more ng-eNBs and one or more gNBs. The ng-eNB is an LTE eNodeB that accesses a 5G core network, and the gNB is a 5G NodeB that accesses the 5G core network. Further, the NG-RAN may further include one or more terminal devices. In addition, the core network includes functions such as an access and mobility management function AMF and a location management function LMF. The LMF is an apparatus or a component deployed in the core network to provide a positioning function for the terminal device. The AMF is configured to implement a function such as access management, and the LMF is configured to implement a function such as a positioning center. The AMF and the LMF are connected through an NLs interface.

Figure 2:
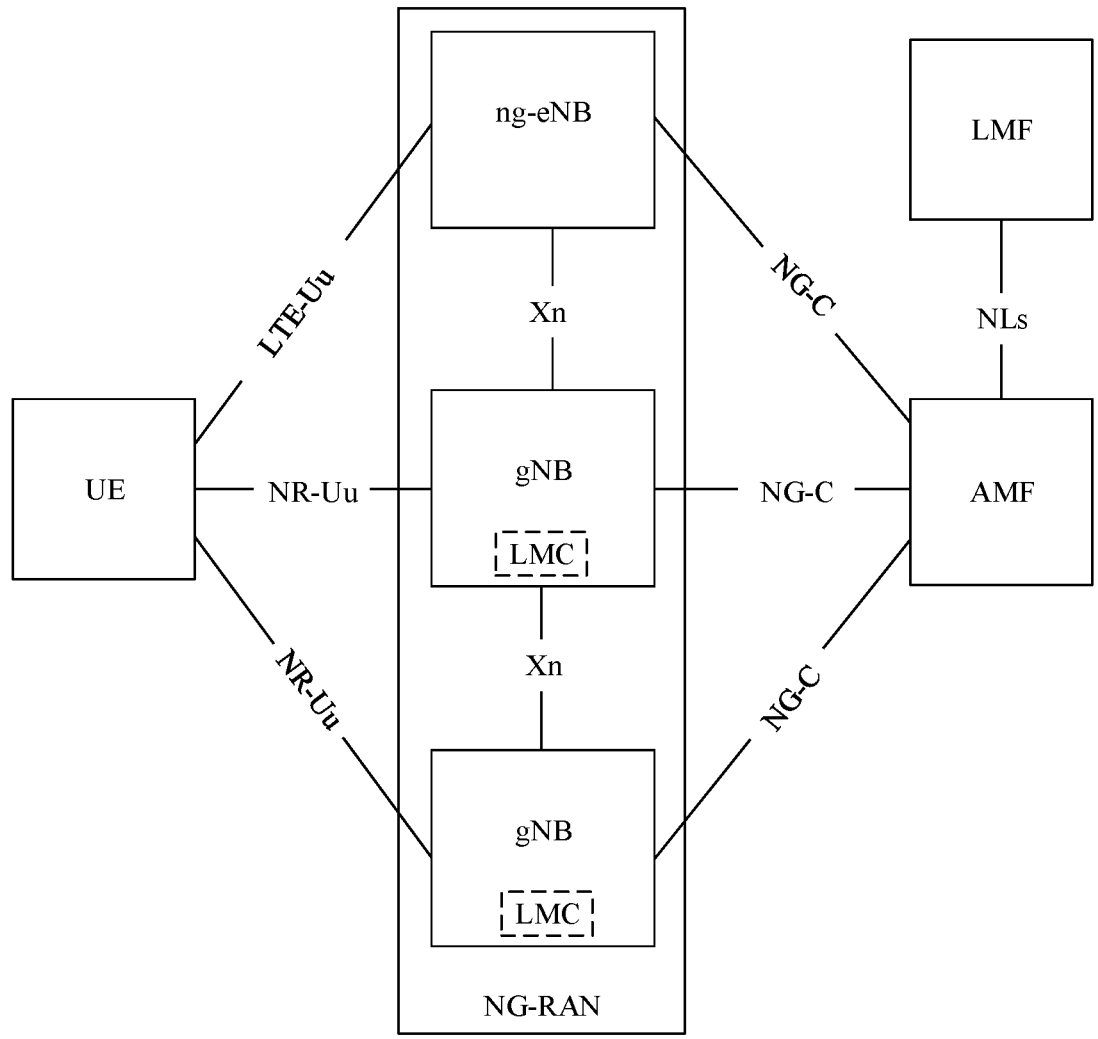
FIG. 2 is a schematic diagram of an architecture of another positioning system to which an embodiment of this application is applied.

FIG. 2 is a schematic diagram of an architecture of another positioning system to which an embodiment of this application is applied. A difference between the architecture of the positioning system in FIG. 1 and that in FIG. 2 lies in that the apparatus or the component of the location management function (for example, the LMF) in FIG. 1 is deployed in a core network, and the apparatus or the component of the positioning management function (for example, the location management component LMC) in FIG. 2 may be deployed in a base station. As shown in FIG. 2, the LMC undertakes some functions of the LMF and can be integrated into a gNB on an NG-RAN side. In this way, to implement the functions of the LMF that the LMC undertakes, a 5G core network does not need to be introduced by using an AMF, thereby reducing a signaling latency.

It should be understood that the positioning system shown in FIG. 1 or FIG. 2 may include one or more gNBs and one or more terminal devices. One gNB may transmit data or control signaling to one or more terminal devices. A plurality of gNBs may alternatively transmit data or control signaling to one terminal device at the same time.

It should be further understood that the device or the function node included in the positioning system shown in FIG. 1 or FIG. 2 is merely an example for description, and does not constitute a limitation on this embodiment of this application. Actually, the positioning system shown in FIG. 1 or FIG. 2 may further include another network element, device, or function node that has an interaction relationship with the device or the function node shown in the figure. This is not specifically limited herein.

To facilitate understanding of a relative angle-based positioning method provided in the embodiments of this application, the following briefly describes several basic concepts in the embodiments of this application.

1. Reference Direction

A setting manner of the reference direction in the relative angle-based positioning method provided in this application includes at least one of the following: (1) an orientation of a linear array of a network device (for example, a gNB) participating in positioning; (2) an orientation of a horizontal dimension of a planar array of a network device (for example, a gNB) participating in positioning; or (3) a direction randomly selected by a network device (for example, a gNB) participating in positioning.

Figure 4:
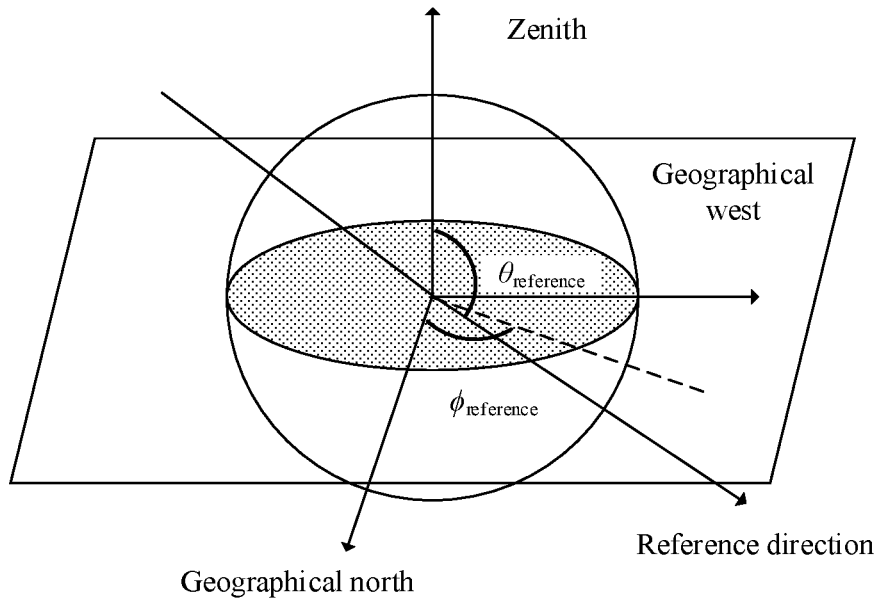
FIG. 4 is a schematic diagram of a direction angle and a pitch angle of a set reference direction.

The reference direction may include:

(1) Direction angle of the reference direction: The direction angle of the reference direction is defined as an included angle between a projection of a direction of a terminal device in a horizontal plane and a geographical north direction, and is a positive angle after counterclockwise rotation is performed, for example, an angle $\phi_{reference}$ shown in FIG. 4. For a sphere in FIG. 4, a geographical north direction, a geographical west direction, and a zenith direction are respectively used as an x axis, a y axis, and a z axis, and a center of an antenna array of a network device participating in positioning is used as an origin, to establish a rectangular coordinate system.

(2) Pitch angle of the reference direction: The direction angle of the reference direction is defined as an included angle between a direction of a terminal device and a zenith direction, for example, an angle $\theta_{reference}$ shown in FIG. 4.

Figure 5:
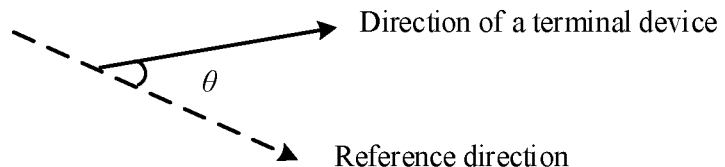
FIG. 5 is a schematic diagram of a conical surface determined by a positioning center.

2. Angle of a Direction of a Terminal Device Relative to a Set Reference Direction The angle of the direction of the terminal device relative to the set reference direction is obtained by a network device participating in positioning through measurement and/or calculation, for example, an angle θ shown in FIG. 5. The angle of the direction of the terminal device relative to the set reference direction is in a range of $[0, \pi]$. When the angle is 0, it indicates that the direction of the terminal device is the same as the set reference direction. When the angle is $\pi/2$, it indicates that the direction of the terminal device is perpendicular to the set reference direction. When the angle is π, it indicates that the direction of the terminal device is opposite to the set reference direction.

3. AoA Positioning Method

The angle-of-arrival (AOA) positioning method is a positioning method based on an angle of arrival of a signal, and is a typical ranging-based positioning method. In the method, some hardware devices perceive a direction of arrival of a signal of a transmit node, calculate a relative direction or angle between a receive node and an anchor node, and obtain a location of an unknown node through calculation by using a triangular measurement method or in another manner. The angle-of-arrival (AOA)-based positioning method is a common wireless sensor network node self-positioning method. The method has low communication overheads and high positioning accuracy.

Specifically, in the positioning technology, directional antennas or array antennas are generally set at at least two locations, to obtain angle information of a radio wave signal transmitted by a terminal device, and then estimate a location of the terminal device by using an intersection method. In the positioning technology, initial positioning of the terminal device can be completed by using only two antenna arrays. Compared with a positioning system of an observed time of arrival (OTDOA) technology or the like, the positioning technology has a simple system structure, but requires high sensitivity and high spatial resolution of the antenna array. A building distribution density, height, and landform affect positioning accuracy of the AOA greatly: In an indoor area, an urban area, and a rural area, typical values in the AOA are 360°, 20°, and 1° respectively. As a distance between a base station and the terminal device increases, positioning accuracy of the AOA gradually decreases. An AOA positioning error is mainly caused by urban multi-path propagation and system errors. Impact of the system error can be offset by pre-correction. A multi-path effect in a building-intensive area is always a problem that affects antenna communication. A smart antenna may reduce impact of multi-path interference to some extent, but is not widely used due to complex implementation and device costs.

4. AoD Positioning Method

A positioning principle of the angle-of-departure (AoD) positioning method is similar to that of the angle-of-arrival (AOA) positioning method. A difference lies in that the angle-of-arrival (AOA) positioning method generally requires a base station to have a single antenna and a terminal device to have a plurality of antennas, and the terminal device needs to receive a reference signal and calculate an angle of the terminal device, and then determines a location of the terminal device; and the angle-of-departure (AoD) positioning method generally requires a base station to have a plurality of antennas and a terminal device to have a single antenna, and the terminal device also needs to receive a reference signal and calculate an angle of the terminal device, and then determines a location of the terminal device. Generally, a reason for using the angle-of-departure (AoD) positioning method is that a structure of the terminal device does not need to be too complex, and the terminal device, as a removable device, cannot easily support a multi-antenna requirement, but the base station, as an immobile device, relatively easily implements multi-antenna configuration.

In addition, to facilitate understanding of the embodiments of this application, the following several descriptions are provided.

First, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Second, first, second, and various digital numbers shown in this application are merely described for easy division, and are not used to limit the scope of this application.

Third, "being stored" in the embodiments of this application may be "being stored in one or more memories". The one or more memories may be separately disposed, or may be integrated into an encoder, a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this application.

Fourth, a "protocol" in the embodiments of this application may be a standard protocol in the communications field, for example, may include an LTE protocol, an NR protocol, and a related protocol applied to a future communications system. This is not limited in this application.

It should be further understood that a specific structure of an execution body of a method provided in the embodiments of this application is not particularly limited in the embodiments of this application, provided that a program that records related code for the method provided in the embodiments of this application can be run to perform communication according to the method provided in the embodiments of this application. For example, the execution body of the method provided in the embodiments of this application may be a network device or a positioning center, or may be a function module that can invoke and execute the program in the network device or the positioning center.

Without loss of generality, the following uses interaction between a network device participating in positioning and a positioning center, a terminal device, and a serving cell that participate in positioning as an example to describe in detail the relative angle-based positioning method provided in the embodiments of this application.

Figure 3:
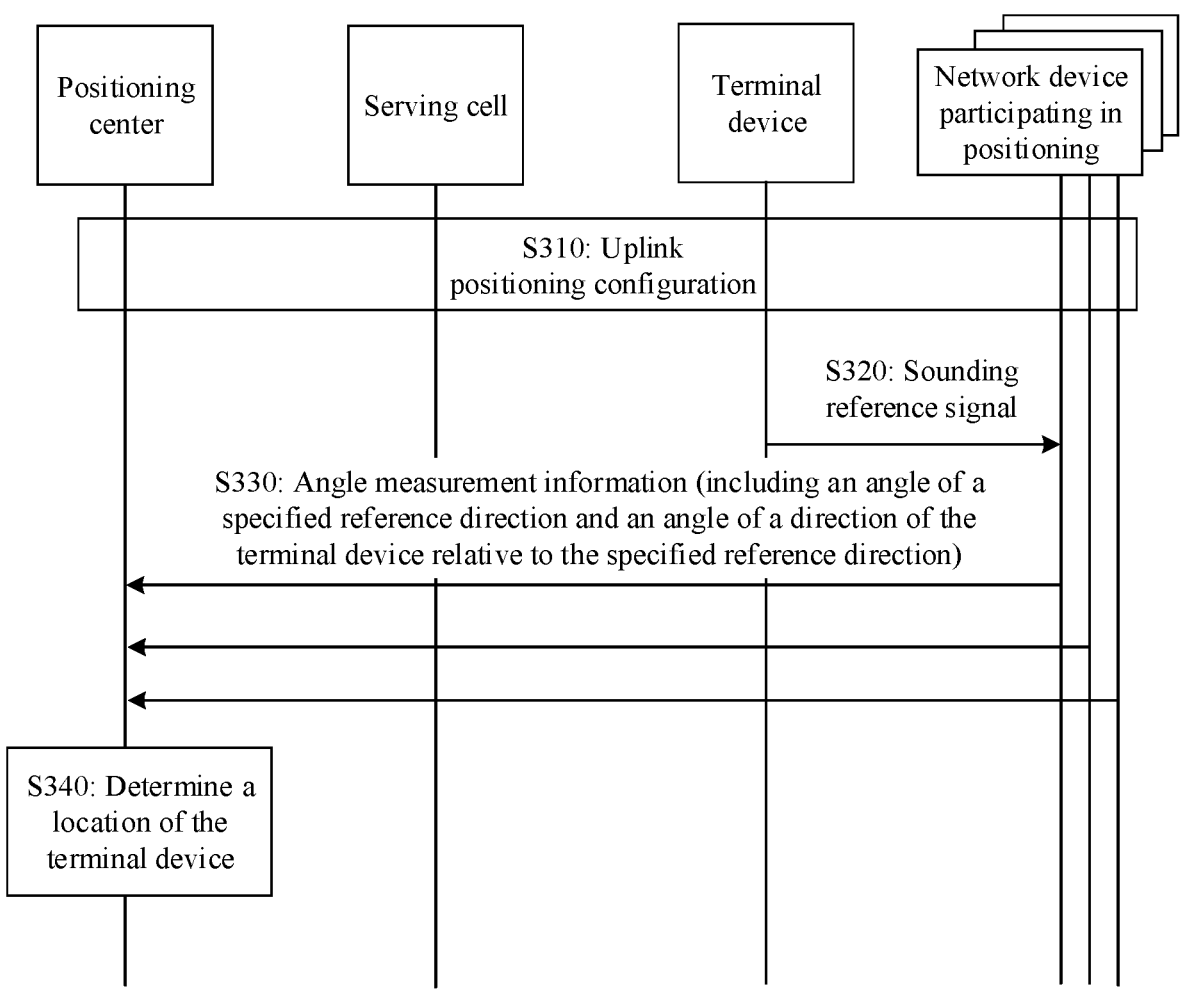
FIG. 3 is a schematic flowchart of a relative angle-based positioning method according to an embodiment of this application.

FIG. 3 is a schematic flowchart of a relative angle-based positioning method according to an embodiment of this application. The method may be applied to an angle-of-arrival (AoA) positioning method. The method includes: A network device reports angle measurement information to a positioning center, where the angle measurement information includes a set reference direction and an angle of a direction of a terminal device relative to the set reference direction. The positioning center determines, based on the angle measurement information, a conical surface on which the terminal device is located, and determines a location of the terminal device based on an intersection point or an intersection line of a plurality of conical surfaces. The method may include but is not limited to the following steps.

S310: A network device participating in positioning exchanges an uplink positioning configuration with a positioning center, a terminal device, and a serving cell that participate in positioning.

Specifically, the uplink positioning configuration includes uplink sounding reference signal (SRS) configuration information, uplink physical random access channel (PRACH) configuration information, and the like. The network device participating in positioning may be an LTE eNodeB ng-eNB or a 5G NodeB gNB, and there may be one or more network devices participating in positioning. The positioning center participating in positioning may be a location management function LMF or a location management component LMC in an NG-RAN architecture. The location management component LMC may be integrated into a network device of the serving cell (for example, a gNB of the serving cell), or may be integrated into any network device participating in positioning (for example, a gNB participating in positioning), or may be integrated into any network device that does not participate in positioning (for example, a gNB that does not participate in positioning). The location management component LMC is integrated into a network device (for example, a gNB), and undertakes some functions of the LMF. In this way, to implement the functions of the LMF that the LMC undertakes, a 5G core network does not need to be introduced by using an AMF, thereby reducing a signaling latency. In addition, the network device participating in positioning may include a network device of the serving cell (for example, a gNB of the serving cell), or may not include a network device of the serving cell.

It should be noted that the foregoing process of exchanging the uplink positioning configuration includes a process of sending, receiving, and forwarding the uplink positioning configuration information between the network device participating in positioning and a device such as the positioning center, the terminal device, and the serving cell that participate in positioning, and may further include a process of sending, receiving, and forwarding information obtained after the uplink positioning configuration information is processed. The interaction process may meet an LTE protocol, an NR protocol, and a related protocol that can be applied to a future communications system. This is not limited in this application, and details are not described herein.

S320: The terminal device sends an uplink reference signal to the network device participating in positioning.

The uplink reference signal may be an uplink sounding reference signal SRS, an uplink physical random access channel PRACH, or the like. The network device participating in positioning measures and/or calculates the received uplink reference signal to obtain angle measurement information of the uplink reference signal.

In a possible implementation, the angle measurement information includes a set reference direction and an angle of a direction of the terminal device relative to the set reference direction. The reference direction is set by the network device participating in positioning, and a setting manner of the reference direction includes: (1) an orientation of a linear array of the network device (for example, a gNB) participating in positioning; (2) an orientation of a horizontal dimension of a planar array of the network device (for example, a gNB) participating in positioning; or (3) a direction randomly selected by the network device (for example, a gNB) participating in positioning. The set reference direction includes: (1) a direction angle and a pitch angle, where the direction angle is, for example, an angle $\phi_{reference}$ shown in FIG. 4, and the pitch angle is, for example, an angle $\theta_{reference}$ shown in FIG. 4; or (2) only a direction angle, for example, an angle $\phi_{reference}$ shown in FIG. 4, where a pitch angle is set to $\pi/2$. It should be noted that, for a sphere in FIG. 4, a geographical north direction, a geographical west direction, and a zenith direction are respectively used as an x axis, a y axis, and a z axis, and a center of an antenna array of a network device participating in positioning is used as an origin, to establish a rectangular coordinate system shown in the figure. The angle of the direction of the terminal device relative to the set reference direction needs to be obtained by the network device participating in positioning through measurement and/or calculation, for example, an angle $\theta$ shown in FIG. 5. The angle of the direction of the terminal device relative to the set reference direction is in a range of $[0, \pi]$. When the angle is 0, it indicates that the direction of the terminal device is the same as the set reference direction. When the angle is $\pi/2$, it indicates that the direction of the terminal device is perpendicular to the set reference direction. When the angle is $\pi$, it indicates that the direction of the terminal device is opposite to the set reference direction.

S330: The network device participating in positioning reports the angle measurement information to the positioning center.

It should be understood that there may be one or more network devices participating in positioning, and the angle measurement information is in a one-to-one correspondence with the network device participating in positioning. One network device participating in positioning processes one or more uplink reference signals to obtain one piece of angle measurement information. For example, three network devices participating in positioning process eight uplink reference signals to obtain three pieces of angle measurement information that are in a one-to-one correspondence with the three network devices participating in positioning.

S340): The positioning center determines a location of the terminal device based on the angle measurement information.

Figure 6:
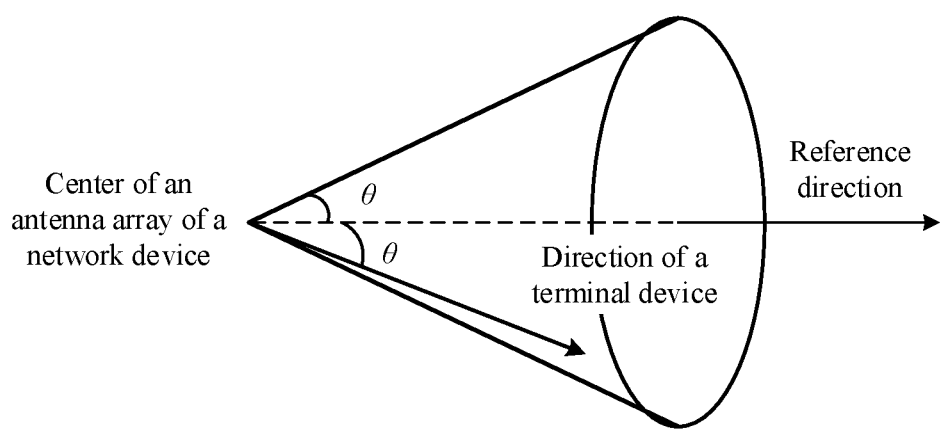
FIG. 6 is a schematic diagram of an angle between a direction of a terminal device and a set reference direction.

In a possible implementation, the positioning center determines the location of the terminal device based on the angle measurement information received from the network device participating in positioning. Specifically, the positioning center may determine, based on the received angle measurement information, a conical surface centered on the set reference direction included in the angle measurement information. As shown in FIG. 6, a center line of the conical surface is the set reference direction, the angle of the direction of the terminal device relative to the set reference direction is $\theta$, a vertex of the conical surface is a center of an antenna array of the network device participating in positioning, and the vertex of the conical surface may correspond to a sphere center in FIG. 4.

Figure 7:
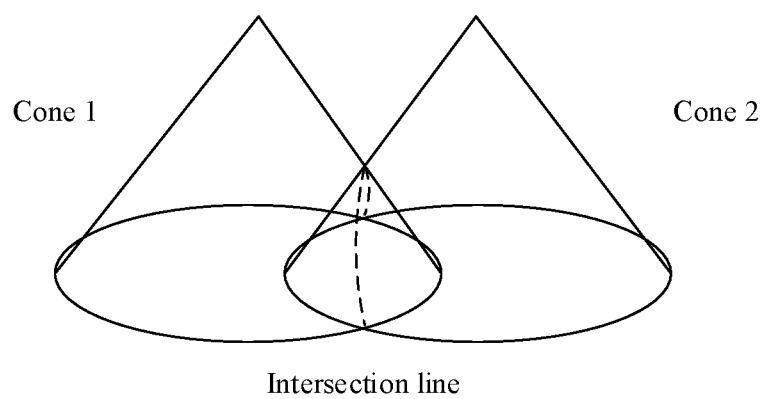
FIG. 7 is a schematic diagram of an intersection line of two drawn conical surfaces.

A plurality of network devices participating in positioning may report a plurality of pieces of angle measurement information, and the positioning center may determine a plurality of conical surfaces based on the plurality of pieces of angle measurement information. There may be one or more network devices participating in positioning. The network device participating in positioning is in a one-to-one correspondence with angle measurement information reported by the network device, and the angle measurement information is in a one-to-one correspondence with a conical surface determined by the network device. The location of the terminal device is an intersection point or an intersection line of the plurality of conical surfaces determined by the positioning center, and the positioning center may determine the location of the terminal device based on the intersection point or the intersection line of the plurality of conical surfaces and other related information. In FIG. 7, an example in which there are two network devices participating in positioning is used. An intersection line (a dashed line in the figure) of two conical surfaces is schematically drawn. The two network devices participating in positioning respectively correspond to the two conical surfaces in the figure, and a reference direction set by each network device participating in positioning is a vertical direction. It may be learned from FIG. 7 that the positioning center may determine the location information of the terminal device based on the intersection line (the dashed line in the figure) of the two conical surfaces in the figure and other related information.

It should be noted that, in the relative angle-based positioning method provided in this application, the location of the terminal device is the intersection point or the intersection line of the plurality of conical surfaces determined by the positioning center. To generate an intersection point or an intersection line of a plurality of conical surfaces, at least two conical surfaces need to exist. Because a network device participating in positioning is in a one-to-one correspondence with angle measurement information reported by the network device participating in positioning, and the angle measurement information is in a one-to-one correspondence with a conical surface determined by the network device participating in positioning, there needs to be at least two network devices participating in positioning according to reasoning. However, in a process of actually applying the relative angle-based positioning method provided in this application, there may be at least one network device participating in positioning. The positioning center may determine one conical surface based on one piece of angle measurement information reported by one network device participating in positioning, and then determine the location of the terminal device with reference to other related information. Similarly, the positioning center may determine two conical surfaces based on two pieces of angle measurement information reported by two network devices participating in positioning, to obtain an intersection line of the two conical surfaces, and then determine the location of the terminal device with reference to other related information. Therefore, there may be one or more network devices participating in positioning.

It should be further understood that, in this embodiment of this application, a manner of information exchange between the network device participating in positioning and the positioning center, the terminal device, and the serving cell that participate in positioning is not limited. For details, refer to provisions in an existing protocol. Alternatively, a manner of information exchange between the network device participating in positioning and the positioning center, the terminal device, and the serving cell that participate in positioning may be a manner of information exchange specified in another protocol after development of a communications technology. Details are not described herein.

Figure 8:
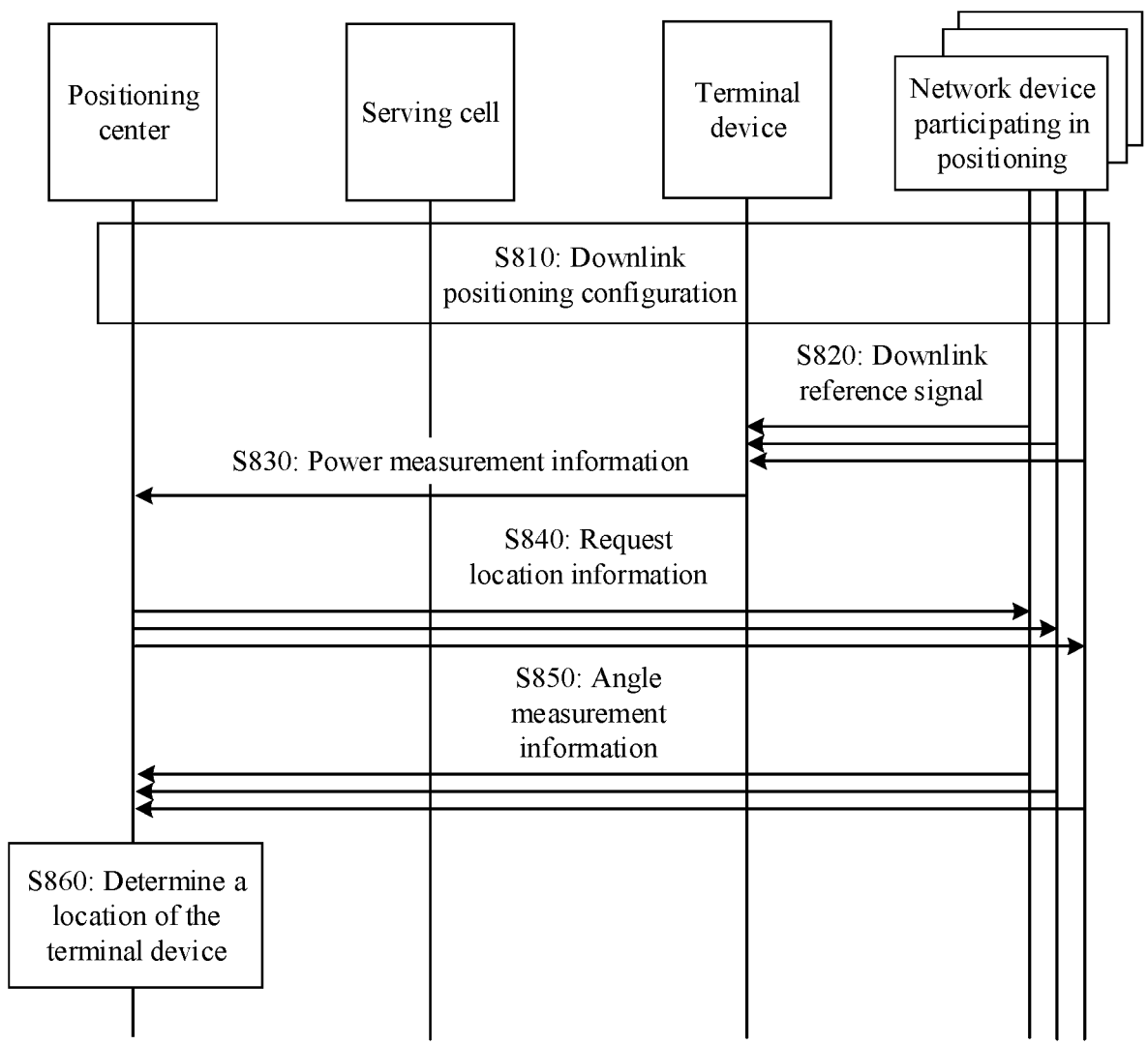
FIG. 8 is a schematic flowchart of another relative angle-based positioning method according to an embodiment of this application.

The relative angle-based positioning method provided in the foregoing embodiment may be applied to an uplink angle of arrival (AoA) positioning method. In a positioning method in the conventional technology, a set reference direction is fixed to a zenith direction or a north direction. The positioning method provided in this embodiment of this application may support a flexible reference direction setting manner. In addition, in the positioning method in the conventional technology, a location of a terminal device is determined by estimating a direction angle and a pitch angle of the terminal device. In the method, a plurality of rays are determined by a plurality of network devices participating in positioning, and an intersection point of the rays is the location of the terminal device. When the direction angle and the pitch angle of the terminal device are estimated by using the method, an antenna array of the network device participating in positioning needs to be a planar array, that is, a two-dimensional antenna array. Consequently, construction costs of the network device increase, and a form of the antenna array is limited. In the positioning method in the conventional technology, the location of the terminal device may alternatively be determined by using only the direction angle. In the method, a plurality of planes are determined by the plurality of network devices participating in positioning, and the location of the terminal is an intersection line or an intersection point of the plurality of planes. Generally, an intersection line of a horizontal plane is perpendicular to the horizontal plane. This means that horizontal coordinates of the terminal device can be obtained. However, when the antenna array of the network device participating in positioning is a linear array, the method is only applicable to horizontal antenna linear array positioning, and is an approximate method when the pitch angle is close to 90 degrees (for example, the terminal device is relatively far from the base station, and an elevation difference may be ignored). When the terminal device is relatively close to the network device participating in positioning, an approximate error of the method is relatively large. Consequently, estimation of the direction angle of the terminal device is inaccurate, and a positioning error of the terminal device increases. The relative angle-based positioning method provided in this embodiment of this application includes: The network device participating in positioning reports the angle measurement information to the positioning center, where the angle measurement information includes the set reference direction and the angle of the direction of the terminal device relative to the set reference direction. The positioning center determines the conical surface on which the terminal device is located based on the reported angle measurement information, and determines the location of the terminal device based on the intersection point or the intersection line of the plurality of conical surfaces. In the relative angle-based positioning method, a problem that positioning is inaccurate when the terminal device approaches the network device participating in positioning does not exist, and positioning accuracy of the terminal device is improved FIG. 8 is a schematic flowchart of another relative angle-based positioning method according to an embodiment of this application. The method may be applied to an angle of departure (Angle of Departure·AoD) positioning method. The method includes: A positioning center calculates angle measurement information or requests angle measurement information from a network device participating in positioning based on power measurement information reported by a terminal device, where the angle measurement information includes a set reference direction and an angle of a direction of the terminal device relative to the set reference direction. The positioning center determines a conical surface on which the terminal device is located based on the angle measurement information calculated by the positioning center or received from the network device participating in positioning, and determines a location of the terminal device based on an intersection point or an intersection line of a plurality of conical surfaces. The method may include but is not limited to the following steps.

S810: A positioning center participating in positioning exchanges a downlink positioning configuration with a network device, a terminal device, and a serving cell that participate in positioning.

Specifically, the downlink positioning configuration may include downlink synchronization signal block (SSB) configuration information, downlink positioning reference signal (PRS) configuration information, and the like. The network device participating in positioning may be an LTE eNodeB ng-eNB or a 5G NodeB gNB, and there may be one or more network devices participating in positioning. The positioning center participating in positioning may be a location management function LMF or a location management component LMC in an NG-RAN architecture. The location management component LMC may be integrated into a network device of the serving cell (for example, a gNB of the serving cell), or may be integrated into any network device participating in positioning (for example, a gNB participating in positioning), or may be integrated into any network device that does not participate in positioning (for example, a gNB that does not participate in positioning). The location management component LMC is integrated into a network device (for example, a gNB), and undertakes some functions of the LMF. In this way, to implement the functions of the LMF that the LMC undertakes, a 5G core network does not need to be introduced by using an AMF, thereby reducing a signaling latency. In addition, the network device participating in positioning may include a network device of the serving cell (for example, a gNB of the serving cell), or may not include a network device of the serving cell.

It should be noted that the foregoing process of exchanging the downlink positioning configuration includes a process of sending, receiving, and forwarding the downlink positioning configuration information between the network device participating in positioning and a device such as the positioning center, the terminal device, and the serving cell that participate in positioning, and may further include a process of sending, receiving, and forwarding information obtained after the downlink positioning configuration information is processed. The interaction process may meet an LTE protocol, an NR protocol, and a related protocol that can be applied to a future communications system. This is not limited in this application, and details are not described herein.

S820: The network device participating in positioning sends a downlink reference signal to the terminal device.

The downlink reference signal may be a downlink synchronization signal block SSB, a downlink positioning reference signal PRS, or the like. The terminal device calculates and/or measures the received downlink reference signal to obtain power measurement information of the downlink reference signal.

It should be noted that the power measurement information includes one or more pieces of reference signal received power (RSRP) and/or one or more pieces of path power that are of one or more downlink reference signals and that are determined by the terminal device through measurement.

It should be understood that there are one or more network devices participating in positioning, and angle measurement information is in a one-to-one correspondence with the network device participating in positioning. The terminal device processes the one or more downlink reference signals to obtain one or more pieces of power measurement information. The network device participating in positioning processes the one or more pieces of power measurement information included in request location information, to obtain the angle measurement information that is in a one-to-one correspondence with the network device participating in positioning. For example, the terminal device processes eight downlink reference signals to obtain eight pieces of power measurement information. Three network devices participating in positioning process the eight pieces of power measurement information included in the request location information, to obtain three pieces of angle measurement information that are in a one-to-one correspondence with the three network devices participating in positioning.

S830: The terminal device reports the power measurement information to the positioning center.

S840: The positioning center requests the angle measurement information from the network device participating in positioning.

In a possible implementation, the positioning center has a calculation capability, and determines location information of the terminal device through calculation and/or measurement based on the power measurement information reported by the terminal device. In this implementation, step S840 and step S850 may not be performed. In this embodiment of the relative angle-based positioning method, step S860 may be directly performed after step S830.

In another possible implementation, the positioning center does not have a calculation capability, and needs to request the angle measurement information from the network device participating in positioning. Specifically, the positioning center sends the request location information (RLI) to the network device participating in positioning. The request location information includes the power measurement information, the request location information is used to indicate the network device participating in positioning to determine the angle measurement information based on the power measurement information, and the angle measurement information includes a set reference direction and an angle of a direction of the terminal device relative to the set reference direction. After calculating and/or measuring the power measurement information, the network device participating in positioning obtains the angle measurement information, and sends the angle measurement information to the positioning center.

S850: The network device participating in positioning reports the angle measurement information to the positioning center.

In a possible implementation, the angle measurement information includes a set reference direction and an angle of a direction of the terminal device relative to the set reference direction. The reference direction is set by the network device participating in positioning. The set reference direction includes: (1) a direction angle and a pitch angle, where the direction angle is, for example, an angle $\phi_{reference}$ shown in FIG. 4, and the pitch angle is, for example, an angle $\theta_{reference}$ shown in FIG. 4; or (2) only a direction angle, for example, $\phi_{reference}$ shown in FIG. 4, where a pitch angle is set to $\pi/2$. It should be noted that, for a sphere in FIG. 4, a geographical north direction, a geographical west direction, and a zenith direction are respectively used as an x axis, a y axis, and a z axis, and a center of an antenna array of a network device participating in positioning is used as an origin, to establish a rectangular coordinate system shown in the figure. The angle of the direction of the terminal device relative to the set reference direction needs to be obtained by the network device participating in positioning through measurement and/or calculation, for example, an angle $\theta$ shown in FIG. 5. The angle of the direction of the terminal device relative to the set reference direction is in a range of $[0, \pi]$. When the angle is 0, it indicates that the direction of the terminal device is the same as the set reference direction. When the angle is $\pi/2$, it indicates that the direction of the terminal device is perpendicular to the set reference direction. When the angle is $\pi$, it indicates that the direction of the terminal device is opposite to the set reference direction.

In a possible implementation, the positioning center has a calculation capability, and may obtain the angle measurement information through calculation and/or measurement based on the power measurement information reported by the terminal device in step S830, and determine the location of the terminal device based on the angle measurement information. In this implementation, step S840 and step S850 may be omitted, and only another step is performed.

In another possible implementation, the positioning center does not have a calculation capability, and needs to request the angle measurement information from the network device participating in positioning. Specifically, the positioning center sends the request location information (RLI) to the network device participating in positioning. The request location information includes the power measurement information, the request location information is used to indicate the network device participating in positioning to determine the angle measurement information based on the power measurement information, and the angle measurement information includes a set reference direction and an angle of a direction of the terminal device relative to the set reference direction. After calculating and/or measuring the power measurement information, the network device participating in positioning obtains the angle measurement information, and sends the angle measurement information to the positioning center.

It should be noted that, specifically, the positioning center may determine, based on the received angle measurement information, a conical surface centered on the set reference direction included in the angle measurement information. As shown in FIG. 6, a center line of the conical surface is the set reference direction, the angle of the direction of the terminal device relative to the set reference direction is θ, a vertex of the conical surface is a center of an antenna array of the network device participating in positioning, and the vertex of the conical surface may correspond to a sphere center in FIG. 4. A plurality of network devices participating in positioning may report a plurality of pieces of angle measurement information, and the positioning center may determine a plurality of conical surfaces based on the plurality of pieces of angle measurement information. There may be one or more network devices participating in positioning. The network device participating in positioning is in a one-to-one correspondence with angle measurement information reported by the network device, and the angle measurement information is in a one-to-one correspondence with a conical surface determined by the network device. The location of the terminal device is an intersection point or an intersection line of the plurality of conical surfaces determined by the positioning center, and the positioning center may determine the location of the terminal device based on the intersection point or the intersection line of the plurality of conical surfaces and other related information.

It should be further noted that, in the relative angle-based positioning method provided in this application, the location of the terminal device is the intersection point or the intersection line of the plurality of conical surfaces determined by the positioning center. To generate an intersection point or an intersection line of a plurality of conical surfaces, at least two conical surfaces need to exist. Because a network device participating in positioning is in a one-to-one correspondence with angle measurement information reported by the network device participating in positioning, and the angle measurement information is in a one-to-one correspondence with a conical surface determined by the network device participating in positioning, there needs to be at least two network devices participating in positioning according to reasoning. However, in a process of actually applying the relative angle-based positioning method provided in this application, there may be at least one network device participating in positioning. The positioning center may determine one conical surface based on one piece of angle measurement information reported by one network device participating in positioning, and then determine the location of the terminal device with reference to other related information. Similarly, the positioning center may determine two conical surfaces based on two pieces of angle measurement information reported by two network devices participating in positioning, to obtain an intersection line of the two conical surfaces, and then determine the location of the terminal device with reference to other related information. Therefore, there may be one or more network devices participating in positioning.

It should be further understood that, in this embodiment of this application, a manner of information exchange between the network device participating in positioning and the positioning center, the terminal device, and the serving cell that participate in positioning is not limited. For details, refer to provisions in an existing protocol. Alternatively, a manner of information exchange between the network device participating in positioning and the positioning center, the terminal device, and the serving cell that participate in positioning may be a manner of information exchange specified in another protocol after development of a communications technology. Details are not described herein.

The relative angle-based positioning method provided in the foregoing embodiment may be applied to a downlink angle of departure (AoD) positioning method. In a positioning method in the conventional technology, a set reference direction is fixed to a zenith direction or a north direction. The positioning method provided in this embodiment of this application may support a flexible reference direction setting manner. In addition, in the positioning method in the conventional technology, a location of a terminal device is determined by estimating a direction angle and a pitch angle of the terminal device. In the method, a plurality of rays are determined by a plurality of network devices participating in positioning, and an intersection point of the rays is the location of the terminal device. When the direction angle and the pitch angle of the terminal device are estimated by using the method, an antenna array of the network device participating in positioning needs to be a planar array, that is, a two-dimensional antenna array. Consequently, construction costs of the network device increase, and a form of the antenna array is limited. In the positioning method in the conventional technology, the location of the terminal device may alternatively be determined by using only the direction angle. In the method, a plurality of planes are determined by the plurality of network devices participating in positioning, and the location of the terminal is an intersection line or an intersection point of the plurality of planes. Generally, an intersection line of a horizontal plane is perpendicular to the horizontal plane. This means that horizontal coordinates of the terminal device can be obtained. However, when the antenna array of the network device participating in positioning is a linear array, the method is only applicable to horizontal antenna linear array positioning, and is an approximate method when the pitch angle is close to 90 degrees (for example, the terminal device is relatively far from the base station, and an elevation difference may be ignored). When the terminal device is relatively close to the network device participating in positioning, an approximate error of the method is relatively large. Consequently, estimation of the direction angle of the terminal device is inaccurate, and a positioning error of the terminal device increases. The relative angle-based positioning method provided in this embodiment of this application includes: The network device participating in positioning reports the angle measurement information to the positioning center, where the angle measurement information includes the set reference direction and the angle of the direction of the terminal device relative to the set reference direction. The positioning center determines the conical surface on which the terminal device is located based on the reported angle measurement information, and determines the location of the terminal device based on the intersection point or the intersection line of the plurality of conical surfaces. In the relative angle-based positioning method, a problem that positioning is inaccurate when the terminal device approaches the network device participating in positioning does not exist, and positioning accuracy of the terminal device is improved In addition, in this embodiment, if the positioning center has a calculation capability, the procedure of the relative angle-based positioning method in the foregoing embodiment may be further simplified, thereby reducing signaling overheads.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from the perspective of interaction between various devices. It may be understood that, to implement the foregoing functions, each device such as the network device or the positioning center includes a hardware structure and/or a software module corresponding to each function. A person skilled in the art may be aware that with reference to units and algorithm steps in the examples described in the embodiments disclosed in this application, this application can be implemented by hardware or a combination of computer software and hardware. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, the network device or the positioning center may be divided into function modules according to the foregoing method examples. For example, each function module may be obtained through division corresponding to each function, or two or more functions may be integrated into one processing module. The integrated module may be implemented in a form of hardware, or may be implemented in a form of a software function module. It should be noted that, in the embodiments of this application, division into the modules is an example, and is merely a logical function division. In actual implementation, another division manner may be used. The following provides descriptions by using the example in which division into function modules is performed based on functions.

Figure 9:
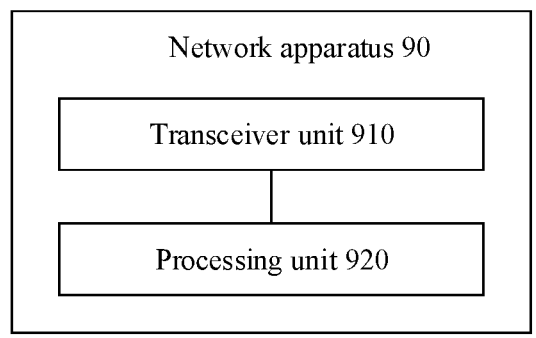
FIG. 9 is a schematic diagram of a network apparatus 90 according to this application.

FIG. 9 is a schematic diagram of a network apparatus 90 according to this application. As shown in FIG. 9, the network apparatus 90 includes a transceiver unit 910 and a processing unit 920. In a possible implementation:

The transceiver unit 910 is configured to exchange an uplink positioning configuration with a positioning center, a terminal device, and a serving cell that participate in positioning.

The transceiver unit 910 is further configured to receive a first reference signal sent by the terminal device.

The transceiver unit 910 is further configured to report angle measurement information to the positioning center, where the angle measurement information includes a set reference direction and an angle of a direction of the terminal device relative to the set reference direction.

It should be understood that, in this embodiment of this application, a manner in which the transceiver unit 910 exchanges information with another device is not limited, and may be based on an LTE protocol, an NR protocol, another protocol that may be applied to a future communications system, or the like.

The processing unit 920 is configured to determine the angle measurement information based on the first reference signal.

Specifically, after measuring and/or calculating an uplink reference signal received by the transceiver unit 910, the processing unit 920 obtains angle measurement information of the uplink reference signal. In a possible implementation, the angle measurement information includes a set reference direction and an angle of a direction of the terminal device relative to the set reference direction. The set reference direction is flexibly set by the processing unit 920. A setting manner includes at least one of the following: an orientation of an antenna linear array of the network apparatus 90; an orientation of a horizontal dimension of an antenna planar array of the network apparatus 90; or a direction randomly selected by the network apparatus 90. The angle of the direction of the terminal device relative to the set reference direction needs to be obtained by the processing unit 920 through measurement and/or calculation. The relative angle-based positioning method may support antenna linear array-based angle positioning. In another possible implementation:

The transceiver unit 910 is configured to exchange a downlink positioning configuration with a positioning center, a terminal device, and a serving cell that participate in positioning.

The transceiver unit 910 is further configured to send a second reference signal to the terminal device.

The transceiver unit 910 is further configured to receive request location information sent by the positioning center, where the request location information includes power measurement information, the power measurement information is determined by the terminal device based on one or more second reference signals, the request location information is used to indicate the processing unit 920 to determine angle measurement information based on the power measurement information, and the angle measurement information includes a set reference direction and an angle of a direction of the terminal device relative to the set reference direction.

The transceiver unit 910 is further configured to report the angle measurement information to the positioning center.

The processing unit 920 is configured to determine the angle measurement information based on the power measurement information.

Specifically, after measuring and/or calculating the power measurement information received by the transceiver unit 910, the processing unit 920 obtains angle measurement information of a downlink reference signal. The transceiver unit 910 reports the angle measurement information to the positioning center, and the positioning center determines, based on the received angle measurement information, a conical surface centered on the set reference direction included in the angle measurement information. A plurality of network apparatuses 90 participating in positioning may report a plurality of pieces of angle measurement information by using the transceiver unit 910, and the positioning center may determine a plurality of conical surfaces based on the plurality of pieces of angle measurement information. There may be one or more network apparatuses 90 participating in positioning. The network apparatus 90 participating in positioning is in a one-to-one correspondence with angle measurement information reported by the network apparatus 90, and the angle measurement information is in a one-to-one correspondence with a conical surface determined by the network apparatus 90. A location of the terminal device is an intersection point or an intersection line of the plurality of conical surfaces determined by the positioning center. The positioning center may determine the location of the terminal device based on the intersection point or the intersection line of the plurality of conical surfaces and other related information.

It should be noted that the network apparatus 90 completely corresponds to the network device in the method embodiment. The network apparatus 90 may be the network device in the method embodiment, or a chip or a function module inside the network device in the method embodiment. The corresponding units of the network apparatus 90 are configured to perform corresponding steps performed by the network device in the method embodiment shown in FIG. 3 or FIG. 8.

In the method embodiment shown in FIG. 3, the transceiver unit 910 in the network apparatus 90 performs the receiving and sending steps performed by the network device in the method embodiment, for example, step S310 of exchanging the uplink positioning configuration with the positioning center, the terminal device, and the serving cell that participate in positioning in FIG. 3, step S320 of receiving the uplink reference signal sent by the terminal device in FIG. 3, and step S330 of reporting the angle measurement information to the positioning center in FIG. 3.

The processing unit 920 performs the step implemented or processed internally by the network device in the method embodiment, for example, the operation of determining the angle measurement information based on the uplink reference signal in step S320 in FIG. 3.

In the method embodiment shown in FIG. 8, the transceiver unit 910 in the network apparatus 90 performs the receiving and sending steps performed by the network device in the method embodiment, for example, step S810 of exchanging the downlink positioning configuration with the positioning center, the terminal device, and the serving cell that participate in positioning in FIG. 8, step S820 of sending the downlink reference signal to the terminal device in FIG. 8, step S840 of receiving the request location information sent by the positioning center in FIG. 8, and step S850 of reporting the angle measurement information to the positioning center in FIG. 8.

The processing unit 920 performs the step implemented or processed internally by the network device in the method embodiment, for example, the operation of determining the angle measurement information based on the request location information and the power measurement information included in the request location information in step S840 in FIG. 8.

The transceiver unit 910 may be a transceiver, and the transceiver may include a receiver and a transmitter. The transceiver may also be referred to as a communications interface or a communications unit.

It should be understood that FIG. 9 is merely an example instead of a limitation. The network apparatus including the transceiver unit and the processing unit may not depend on the structure shown in FIG. 9.

When the network apparatus 90 is a chip, the chip includes a transceiver unit and a processing unit. The transceiver unit may be an input/output circuit or a communications interface. The processing unit may be a processor, a microprocessor, or an integrated circuit integrated on the chip.

Figure 10:
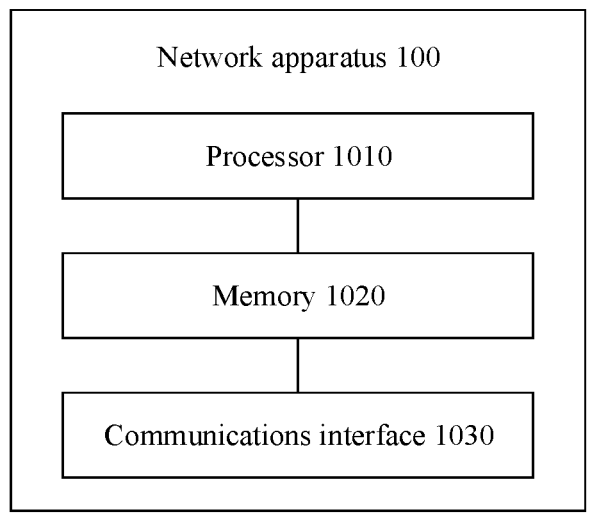
FIG. 10 is a schematic diagram of another network apparatus 100 according to this application.

Referring to FIG. 10, this application further provides a network apparatus 100. The network apparatus 100 includes a processor 1010, configured to implement functions implemented by the network device in the method embodiment shown in FIG. 3 or FIG. 8.

For example, the network apparatus further includes a memory 1020, the memory 1020 is coupled to the processor 1010, and the processor 1010 is configured to implement functions implemented by the network device in the method embodiment shown in FIG. 3 or FIG. 8.

In a possible implementation, the memory 1020 is configured to store program instructions and data. The memory 1020 is coupled to the processor 1010. The processor 1010 may invoke and execute the program instructions stored in the memory 1020, to implement functions implemented by the network device in the method embodiment shown in FIG. 3 or FIG. 8.

For example, the network apparatus 100 further includes a communications interface 1030, and the communications interface 1030 is used by the network apparatus 100 to communicate with another device. When the network apparatus 100 is a network device, the communications interface 1030 includes a transceiver, or the communications interface 1030 includes an input/output interface.

In a possible design, the network apparatus 100 includes a processor 1010 and a communications interface 1030, configured to implement functions implemented by the network device in the method embodiment shown in FIG. 3 or FIG. 8. Details are as follows:

The processor 1010 performs external communication through the communications interface 1030.

The processor 1010 is configured to run a computer program, so that the network apparatus 100 implements functions implemented by the network device in the method embodiment shown in FIG. 3 or FIG. 8.

It may be understood that the external communication may be communication with an object other than the processor 1010, or an object other than the network apparatus 100.

In another implementation, when the network apparatus 100 is a chip or a chip system, the communications interface 1030 includes an input/output interface, an interface circuit, an output circuit, an input circuit, a pin, a related circuit, or the like in the chip or the chip system. The processor 1010 is embodied as a processing circuit or a logic circuit.

Figure 11:
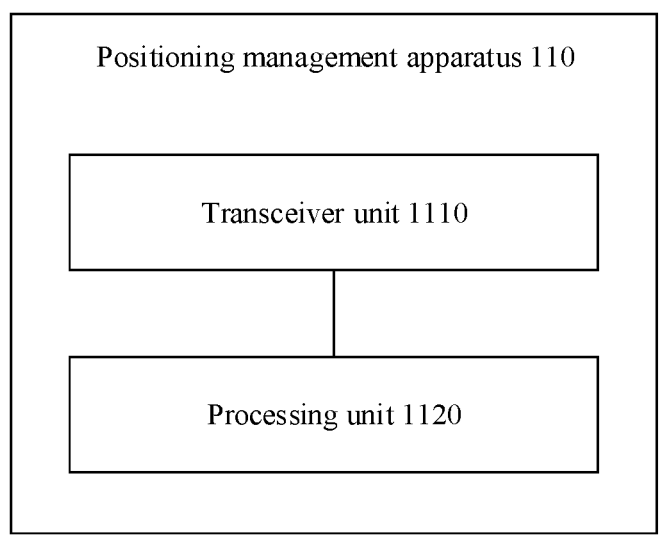
FIG. 11 is a schematic diagram of a positioning management apparatus 110 according to this application.

FIG. 11 is a schematic diagram of a positioning management apparatus 110 according to this application. As shown in FIG. 11, the apparatus 110 includes a transceiver unit 1110 and a processing unit 1120. In a possible implementation:

The transceiver unit 1110 is configured to exchange an uplink positioning configuration with a network device, a terminal device, and a serving cell that participate in positioning.

The transceiver unit 1110 is further configured to receive angle measurement information reported by the network device participating in positioning, where the angle measurement information is determined by the network device participating in positioning based on a first reference signal, the first reference signal is received by the network device participating in positioning from the terminal device, and the angle measurement information includes a set reference direction and an angle of a direction of the terminal device relative to the set reference direction.

The processing unit 1120 is configured to determine a location of the terminal device based on the angle measurement information.

Specifically, the processing unit 1120 determines a plurality of conical surfaces based on the angle measurement information, where the plurality of conical surfaces are in a one-to-one correspondence with the angle measurement information, and the angle measurement information is in a one-to-one correspondence with the network device participating in positioning, where each of the plurality of conical surfaces is centered on a set reference direction included in the angle measurement information corresponding to each of the plurality of conical surfaces. The processing unit 1120 determines the location of the terminal device based on an intersection point or an intersection of the plurality of conical surfaces.

In another possible implementation:

The transceiver unit 1110 is configured to exchange a downlink positioning configuration with a network device, a terminal device, and a serving cell that participate in positioning;

The transceiver unit 1110 is further configured to receive power measurement information reported by the terminal device, where the power measurement information includes one or more pieces of reference signal received power and/or one or more pieces of path power that are of one or more second reference signals and that are determined by the terminal device.

The transceiver unit 1110 is further configured to send request location information to the network device participating in positioning, where the request location information includes the power measurement information, the request location information is used to indicate the network device participating in positioning to determine angle measurement information based on the power measurement information, and the angle measurement information includes a set reference direction and an angle of a direction of the terminal device relative to the set reference direction.

The transceiver unit 1110 is further configured to receive the angle measurement information reported by the network device participating in positioning.

The processing unit 1120 is configured to determine a location of the terminal device based on the angle measurement information.

In a possible implementation, the processing unit 1120 is further configured to: obtain the angle measurement information through calculation based on the power measurement information, and determine the location of the terminal device based on the angle measurement information.

That the processing unit 1120 determines a location of the terminal device based on the angle measurement information includes: The processing unit determines a plurality of conical surfaces based on the angle measurement information, where the plurality of conical surfaces are in a one-to-one correspondence with the angle measurement information, and the angle measurement information is in a one-to-one correspondence with the network device participating in positioning, where each of the plurality of conical surfaces is centered on a set reference direction included in the angle measurement information corresponding to each of the plurality of conical surfaces. The processing unit 1120 determines the location of the terminal device based on an intersection point or an intersection of the plurality of conical surfaces.

The positioning management apparatus 110 completely corresponds to the positioning center in the method embodiment. The positioning management apparatus 110 may be the positioning center in the method embodiment, or a chip or a function module inside the positioning center in the method embodiment. The corresponding units of the positioning management apparatus 110 are configured to perform corresponding steps performed by the positioning center in the method embodiment shown in FIG. 3 or FIG. 8.

In the method embodiment shown in FIG. 3, the transceiver unit 1110 in the positioning management apparatus 110 performs the receiving and sending steps performed by the positioning center in the method embodiment, for example, step S310 of exchanging the uplink positioning configuration with the network device, the terminal device, and the serving cell that participate in positioning in FIG. 3, and step S330 of reporting the angle measurement information to the network device participating in positioning in FIG. 3.

The processing unit 1120 in the positioning management apparatus 110 performs the step implemented or processed internally by the positioning center in the method embodiment, for example, step S340 of determining the location of the terminal device based on the angle measurement information in FIG. 3.

In the method embodiment shown in FIG. 8, the transceiver unit 1110 in the positioning management apparatus 110 performs the receiving and sending steps performed by the positioning center in the method embodiment, for example, step S810 of exchanging the downlink positioning configuration with the network device, the terminal device, and the serving cell that participate in positioning in FIG. 8, step S840 of requesting the angle measurement information from the network device participating in positioning in FIG. 8, and step S850 of receiving the angle measurement information reported by the network device participating in positioning in FIG. 8.

The processing unit 1120 in the positioning management apparatus 110 performs the step implemented or processed internally by the positioning center in the method embodiment, for example, step S860 of determining the location of the terminal device based on the angle measurement information in FIG. 8.

The transceiver unit 1110 may be a transceiver, and the transceiver may include a receiver and a transmitter. The transceiver may also be referred to as a communications interface or a communications unit. The processing unit 1120 may be a processor.

It should be understood that FIG. 11 is merely an example instead of a limitation. The network apparatus including the transceiver unit and the processing unit may not depend on the structure shown in FIG. 11.

When the positioning management apparatus 110 is a chip, the chip includes a transceiver unit and a processing unit. The transceiver unit may be an input/output circuit or a communications interface. The processing unit may be a processor, a microprocessor, or an integrated circuit integrated on the chip.

Figure 12:
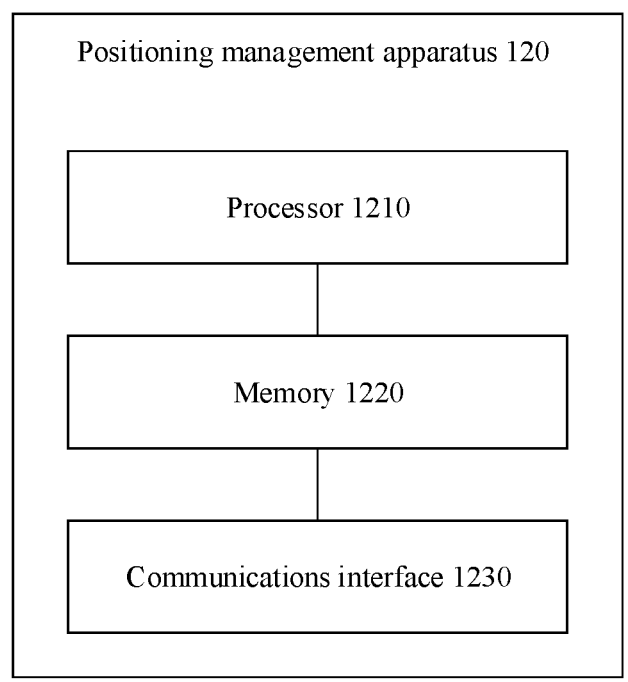
FIG. 12 is a schematic diagram of another positioning management apparatus 120 according to this application.

Referring to FIG. 12, this application further provides a positioning management apparatus 120. The positioning management apparatus 120 includes a processor 1210, configured to implement functions implemented by the positioning center in the method embodiment shown in FIG. 3 or FIG. 8.

For example, the positioning management apparatus 120 further includes a memory 1220, the memory 1220 is coupled to the processor 1210, and the processor 1210 is configured to implement functions implemented by the positioning center in the method embodiment shown in FIG. 3 or FIG. 8.

In a possible implementation, the memory 1220 is configured to store program instructions and data. The memory 1220 is coupled to the processor 1210. The processor 1210 may invoke and execute the program instructions stored in the memory 1220, to implement functions implemented by the positioning center in the method embodiment shown in FIG. 3 or FIG. 8.

For example, the positioning management apparatus 120 further includes a communications interface 1230, and the communications interface 1230 is used by the positioning management apparatus 120 to communicate with another device. When the positioning management apparatus 120 is a positioning center, the communications interface 1230 includes a transceiver, or the communications interface 1230 includes an input/output interface.

In a possible design, the positioning management apparatus 120 includes a processor 1210 and a communications interface 1230, configured to implement functions implemented by the positioning center in the method embodiment shown in FIG. 3 or FIG. 8. Details are as follows:

The processor 1210 performs external communication through the communications interface 1230.

The processor 1210 is configured to run a computer program, so that the positioning management apparatus 120 implements functions implemented by the positioning center in the method embodiment shown in FIG. 3 or FIG. 8.

It may be understood that the external communication may be communication with an object other than the processor 1210, or an object other than the positioning management apparatus 120.

In another implementation, when the positioning management apparatus 120 is a chip or a chip system, the communications interface 1230 includes an input/output interface, an interface circuit, an output circuit, an input circuit, a pin, a related circuit, or the like in the chip or the chip system. The processor 1210 is embodied as a processing circuit or a logic circuit.

An embodiment of this application further provides a communications system, including the foregoing network device, positioning center, terminal device, and serving cell.

This application further provides a computer-readable storage medium. The computer-readable storage medium stores instructions. When the instructions are run on a computer, the computer is enabled to perform the steps performed by the network device in the method shown in FIG. 3 or FIG. 8.

This application further provides a computer-readable storage medium. The computer-readable storage medium stores instructions. When the instructions are run on a computer, the computer is enabled to perform the steps performed by the positioning center in the method shown in FIG. 3 or FIG. 8.

This application further provides a computer program product including instructions. When the computer program product is run on a computer, the computer is enabled to perform the steps performed by the network device in the method shown in FIG. 3 or FIG. 8.

This application further provides a computer program product including instructions. When the computer program product is run on a computer, the computer is enabled to perform the steps performed by the positioning center in the method shown in FIG. 3 or FIG. 8.

This application further provides a chip, including a processor. The processor is configured to read and run a computer program stored in a memory, to execute a corresponding operation and/or procedure that are/is performed by the network device in the relative angle-based positioning method provided in this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that needs to be processed, and the processor obtains the data and/or information from the communications interface, and processes the data and/or information. The communication interface may be an input/output interface.

This application further provides a chip, including a processor. The processor is configured to read and run a computer program stored in a memory, to execute a corresponding operation and/or procedure that are/is performed by the positioning center in the relative angle-based positioning method provided in this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that needs to be processed, and the processor obtains the data and/or information from the communications interface, and processes the data and/or information. The communication interface may be an input/output interface.

The terms "first", "second", "third", "fourth", and the like (if any) in this application are intended to distinguish between similar objects but do not necessarily indicate a specific order or sequence. It should be understood that data termed in such a way is interchangeable in proper circumstances, so that the embodiments of this application described herein can be implemented in other orders than the order illustrated or described herein. In addition, the terms "include", "have" and any other variants mean to cover the non-exclusive inclusion. For example, a process, method, system, product, or device that includes a list of steps or units is not necessarily limited to those units, but may include other units not expressly listed or inherent to such a process, method, product, or device.

It should be understood that the processor in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate, a transistor logic device, a discrete hardware component, or the like. The general purpose processor may be a microprocessor, or the processor may be any conventional processor, or the like.

It should be further understood that the memory in the embodiments of this application may be a volatile memory, or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct Rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

In addition, the term "and/or" in this application describes only an association relationship for describing associated objects and represents that three relationships may exist. For example, A and/or B may indicate the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A relative angle-based positioning method, comprising:
    exchanging, by a network device participating in positioning, an uplink positioning configuration with a positioning center, a terminal device, and a serving cell that participate in positioning;
    receiving, by the network device participating in positioning, a first reference signal sent by the terminal device;
    determining, by the network device participating in positioning, angle measurement information based on the first reference signal, wherein the angle measurement information comprises a set reference direction and an angle of a direction of the terminal device relative to the set reference direction; and
    reporting, by the network device participating in positioning, the angle measurement information to the positioning center;
    wherein a setting manner of the set reference direction comprises one or more of:
        an orientation of an antenna linear array of the network device participating in positioning;
        an orientation of a horizontal dimension of an antenna planar array of the network device participating in positioning; or
        a direction randomly selected by the network device participating in positioning.

2. The method according to claim 1, further comprising:
    determining, by the positioning center, a location of the terminal device based on the angle measurement information.

3. The method according to claim 2, wherein the determining, by the positioning center, the location of the terminal device based on the angle measurement information comprises:
determining, by the positioning center, a plurality of conical surfaces based on the angle measurement information, wherein the plurality of conical surfaces are in a one-to-one correspondence with the angle measurement information, and the angle measurement information is in a one-to-one correspondence with the network device participating in positioning, wherein each of the plurality of conical surfaces is centered on a set reference direction comprised in the angle measurement information corresponding to each of the plurality of conical surfaces; and
determining, by the positioning center, the location of the terminal device based on an intersection point or an intersection line of the plurality of conical surfaces.

4. The method according to claim 1, wherein the set reference direction comprises a direction angle, or a direction angle and a pitch angle; and
wherein when the set reference direction comprises only the direction angle, a corresponding pitch angle is set to $\pi/2$.

5. The method according to claim 1, wherein the angle of the direction of the terminal device relative to the set reference direction is in a range of $[0, \pi]$, wherein when the angle is 0, it indicates that the direction of the terminal device is the same as the set reference direction, when the angle is $\pi/2$, it indicates that the direction of the terminal device is perpendicular to the set reference direction, and when the angle is $\pi$, it indicates that the direction of the terminal device is opposite to the set reference direction.

6. The method according to claim 1, wherein the positioning center is a location management function or a location management component, and the location management component is integrated into a network device of the serving cell, or integrated into the network device participating in positioning, or integrated into a network device that does not participate in positioning.

7. The method according to claim 1, wherein the network device participating in positioning comprises a network device of the serving cell.

8. The method according to claim 1, wherein the uplink positioning configuration comprises uplink sounding reference signal configuration information or uplink physical random access channel configuration information.

9. A relative angle-based positioning method, comprising:
exchanging, by a positioning center participating in positioning, a downlink positioning configuration with a network device, a terminal device, and a serving cell that participate in positioning;
receiving, by the positioning center, power measurement information reported by the terminal device, wherein the power measurement information comprises one or more pieces of reference signal received power and/or one or more pieces of path power that are of one or more second reference signals and that are determined by the terminal device;
sending, by the positioning center, request location information to the network device participating in positioning, wherein the request location information comprises the power measurement information, the request location information is used to indicate the network device participating in positioning to determine the angle measurement information based on the power measurement information, and the angle measurement information comprises a set reference direction and an angle of a direction of the terminal device relative to the set reference direction;
receiving, by the positioning center, the angle measurement information reported by the network device participating in positioning; and
determining, by the positioning center, a location of the terminal device based on the angle measurement information;
wherein a setting manner of the set reference direction comprises one or more of:
an orientation of an antenna linear array of the network device participating in positioning;
an orientation of a horizontal dimension of an antenna planar array of the network device participating in positioning; or
a direction randomly selected by the network device participating in positioning.

10. The method according to claim 9, wherein after the receiving, by the positioning center, the power measurement information reported by the terminal device, the method further comprises:
obtaining, by the positioning center, the angle measurement information through calculation based on the power measurement information; and
determining, by the positioning center, the location of the terminal device based on the angle measurement information.

11. The method according to claim 9, wherein the determining, by the positioning center, the location of the terminal device based on the angle measurement information comprises:
determining, by the positioning center, a plurality of conical surfaces based on the angle measurement information, wherein the plurality of conical surfaces are in a one-to-one correspondence with the angle measurement information, and the angle measurement information is in a one-to-one correspondence with the network device participating in positioning, wherein each of the plurality of conical surfaces is centered on a set reference direction comprised in the angle measurement information corresponding to each of the plurality of conical surfaces; and
determining, by the positioning center, the location of the terminal device based on an intersection point or an intersection line of the plurality of conical surfaces.

12. The method according to claim 9, wherein the set reference direction comprises a direction angle, or a direction angle and a pitch angle; and when the set reference direction comprises only the direction angle, a corresponding pitch angle is set to $\pi/2$.

13. The method according to claim 9, wherein the angle of the direction of the terminal device relative to the set reference direction is in a range of $[0, \pi]$, wherein when the angle is 0, it indicates that the direction of the terminal device is the same as the set reference direction, when the angle is $\pi/2$, it indicates that the direction of the terminal device is perpendicular to the set reference direction, and when the angle is $\pi$, it indicates that the direction of the terminal device is opposite to the set reference direction.

14. The method according to claim 9, wherein the positioning center is a location management function or a location management component, and the location management component is integrated into a network device of the serving cell, or integrated into the network device participating in positioning, or integrated into a network device that does not participate in positioning.

15. The method according to claim 9, wherein the network device participating in positioning comprises a network device of the serving cell.

16. The method according to claim 9, wherein the downlink positioning configuration comprises synchronization signal block configuration information or positioning reference signal configuration information.

17. A relative angle-based positioning method, comprising:
- exchanging, by a positioning center participating in positioning, an uplink positioning configuration with a network device, a terminal device, and a serving cell that participate in positioning;
- receiving, by the positioning center, angle measurement information reported by the network device participating in positioning, wherein the angle measurement information is determined by the network device participating in positioning based on a first reference signal, the first reference signal is received by the network device participating in positioning from the terminal device, and the angle measurement information comprises a set reference direction and an angle of a direction of the terminal device relative to the set reference direction; and
- determining, by the positioning center, a location of the terminal device based on the angle measurement information;
- wherein a setting manner of the set reference direction comprises one or more of:
  - an orientation of an antenna linear array of the network device participating in positioning;
  - an orientation of a horizontal dimension of an antenna planar array of the network device participating in positioning; or
  - a direction randomly selected by the network device participating in positioning.

* * * * *